US010064146B2

(12) United States Patent
Naim et al.

(10) Patent No.: US 10,064,146 B2
(45) Date of Patent: Aug. 28, 2018

(54) METHOD AND SYSTEM FOR SUPPLEMENTARY SERVICES SYNCHRONIZATION ACROSS NETWORKS

(71) Applicant: MAVENIR SYSTEMS, INC., Richardson, TX (US)

(72) Inventors: Ghassan Naim, Plano, TX (US); Anish Sharma, Richardson, TX (US); Bejoy Pankajakshan, Allan, TX (US)

(73) Assignee: Mavenir Systems, Inc., Richardson, TX (US)

( * ) Notice: Subject to any disclaimer, the term of this patent is extended or adjusted under 35 U.S.C. 154(b) by 103 days.

(21) Appl. No.: 15/274,379

(22) Filed: Sep. 23, 2016

(65) Prior Publication Data

US 2017/0086155 A1   Mar. 23, 2017

Related U.S. Application Data

(60) Provisional application No. 62/284,172, filed on Sep. 23, 2015.

(51) Int. Cl.
*H04J 3/06* (2006.01)
*H04W 56/00* (2009.01)
(Continued)

(52) U.S. Cl.
CPC .... *H04W 56/001* (2013.01); *G06F 17/30575* (2013.01); *H04L 41/0233* (2013.01);
(Continued)

(58) Field of Classification Search
CPC .................................................. H04W 56/001
See application file for complete search history.

(56) References Cited

U.S. PATENT DOCUMENTS

2004/0233851 A1* 11/2004 Baldwin ............... H04M 3/36
370/241
2007/0054686 A1*  3/2007 Allen ................... H04W 76/45
455/518
(Continued)

FOREIGN PATENT DOCUMENTS

WO       2015096849 A1    7/2015

OTHER PUBLICATIONS

European Search Report dated Jun. 8, 2017 from corresponding EP Application No. 16190466.9, 27 pages.
(Continued)

*Primary Examiner* — Gerald A Smarth
(74) *Attorney, Agent, or Firm* — Ohlandt, Greeley, Ruggiero & Perle, L.L.P.

(57) ABSTRACT

A system, method, and network node for synchronizing supplementary services settings between a database in a circuit-switched network and a database in a packet-switched network are disclosed. An exemplary communication system synchronization node is configured to receive a message containing a change to a supplementary service setting associated with a user equipment (UE) connected to a circuit-switched (CS) network or a packet-switched (PS) network, and communicate the change to the supplementary service setting to one or both of the HLR and the HSS, so that the supplementary service settings in both the HLR and the HSS are updated to reflect the change to the supplementary service setting.

20 Claims, 26 Drawing Sheets

(51) Int. Cl.
| | |
|---|---|
| *H04W 8/04* | (2009.01) |
| *H04L 29/08* | (2006.01) |
| *H04L 12/24* | (2006.01) |
| *G06F 17/30* | (2006.01) |
| *H04W 8/18* | (2009.01) |
| *H04L 29/06* | (2006.01) |

(52) U.S. Cl.
CPC .......... *H04L 65/10* (2013.01); *H04L 67/1095* (2013.01); *H04L 67/26* (2013.01); *H04W 8/04* (2013.01); *H04W 8/18* (2013.01)

(56) References Cited

U.S. PATENT DOCUMENTS

| | | | | |
|---|---|---|---|---|
| 2008/0220759 | A1* | 9/2008 | Norrman | H04M 3/42136 455/419 |
| 2008/0256112 | A1* | 10/2008 | Prudden | H04L 29/12188 |
| 2011/0151865 | | 6/2011 | Lau et al. | |
| 2011/0188415 | A1* | 8/2011 | Graziano | G06Q 30/02 370/310 |
| 2012/0311107 | A1* | 12/2012 | Van der Merwe | H04L 41/083 709/220 |
| 2016/0100306 | A1* | 4/2016 | Brianza | H04W 8/04 455/433 |

OTHER PUBLICATIONS

European Search Report dated Feb. 28, 2017 from corresponding EP Application No. 16190466.9, 13 pages.

\* cited by examiner

METHOD AND SYSTEM FOR SUPPLEMENTARY SERVICES SYNCHRONIZATION ACROSS NETWORKS

CROSS-REFERENCE TO RELATED APPLICATIONS

This Application claims the benefit of U.S. Provisional Application Ser. No. 62/284,172, entitled SUPPLEMENTARY SERVICES ACROSS DIFFERENT WIRELESS NETWORK DOMAINS, and filed Sep. 23, 2015, the contents of which are hereby incorporated herein by reference.

FIELD OF THE INVENTION

The present disclosure generally relates to communication networks. More particularly, the disclosure relates to methods and systems for synchronizing wireless cellular supplementary services across different wireless network domains that have separate subscriber databases.

BACKGROUND OF THE DISCLOSURE

While different access domains in cellular networks are being deployed, the same handset is used to operate and receive services in the various domains. Feature parity across the different domains is desired or mandated by cellular operators, and the end user handset desirably supports features and services across the network domains without interfering with the user experience. User-based supplementary services updates is one of the services that is desirably transparent to the end user, while the user moves in and out of different network domains.

The user handset desirably receives the same services offered in both network domains. Standard interfaces have been defined in wireless domains, such as IMS (a packet-switched (PS) network) and circuit-switched (CS) networks, to allow the user to change his/her supplementary services settings, regardless of which domain the handset is operating. Given that the access network, core network, call processing servers, and backend provisioning systems are generally separated in both domains, a solution is desired to synchronize the user supplementary services updates or settings that can occur or be initiated in either network. More specifically, in deployments where the subscriber data is sorted in separate databases where, for example, the Home Location Register (HLR) and Home Subscriber Server (HSS) are based on separate platforms (e.g., CS network and PS network, respectively), and no subscriber data management solution has been deployed to provide unified data convergence, a solution is desired to synchronize the user Supplementary Services (SS) data changes in both databases when they are applied by the end user in either domain (the CS or PS network) and/or by an operator in either network.

In addition, for operators that do not have a common backend provisioning system that replicates SS data changes to both CS and PS subscriber databases, such operators apply SS data changes twice, one on each database. This adds operating expenses (OPEX) and process complexity on the operator side. A solution is therefore desired to automate the backend SS data update synchronization across multiple domains.

One known solution to synchronize SS data across the domains is to use Signaling Transfer Point (STP) screening to forward all SS data changes related Mobile Application Part (MAP) traffic to a synchronization node before being the changes are sent to the HLR. The intercepting synchronization node will then update both HLR and HSS in both domains, CS and PS. The shortcomings of this solution are as follows.

(a) The synchronization node is in the path of all subscribers including non-PS (e.g., Legacy subscribers with handsets not capable of 4G) subscribers. This creates an additional hop in the network, and makes the synchronization node a dependency for SS updates for non-4G subscribers.

(b) STP changes are required, and in some deployments these changes are constrained under contracts which will cause additional financial costs on the operator.

(c) The solution will not work if STP does not support screening based on originating node address and MAP operational code (OpCODE).

(d) The solution adds more complexity to the synchronization node, because, desirably, the synchronization node avoids updating HSS for non-4G subscribers. This traffic will be only pass-through, but HSS check is still used for every received request. This solution also adds more capacity requirements on the synchronization node and HSS, because the node and server check and then pass through requests for 2G/3G (not 4G capable) subscribers that are not in the HSS database.

(e) Backend updates done in the CS domain cannot be transferred to the 4G domain if the operator does not have a common backend provisioning system that duplicates the updates to both CS and 4G databases. This is a common problem when introducing Voice-over-4G as an independent solution.

(f) If the synchronization node goes down, both 4G and non-4G subscribers will be affected.

Another known solution is the use of an external Database Synchronization Server (DSS). The DSS will interface to both HLR and HSS, and will update each when a change occurs in either subscriber databases. The shortcomings of this solution are as follows.

(a) There are significant dependencies on the HLR and HSS vendor(s) and on the availability of a direct interface to the DSS.

(b) This is a relatively expensive solution, typically offered by the same vendor of the HLR and IMS HSS.

(c) Periodic database audits are generally required in case the synchronization server fails.

(d) This solution employs a complex DSS solution for database redundancy and real-time replication.

(e) The complexity of the solution increases if both HLR and HSS databases are based on different database engines and protocols, e.g., Oracle vs IBM or Microsoft databases.

(f) This solution employs high interoperability effort.

Another known solution is to anchor all call origination and call termination in the IMS domain. This includes 2G/3G calls. All terminating services will be removed from HLR and applied in IMS domain. SS data changes applied in CS are barred at the HLR. All SS data changes done by the user equipment (UE) are made in the PS domain. The shortcomings of this solution are as follows.

(a) The solution does not address originating services synchronization.

(b) All calls including 3G/3G are routed to the IMS, which increases capacity requirements on the IMS network.

(c) CS calls traverse IMS domain when not otherwise necessary to do so, causing inefficient call routing and inefficient network traffic load distribution.

A solution that overcomes one or more of the above shortcomings is desired. Systems and methods that can update all SS data without impacting non-PS (e.g., non- VoWIFI) subscribers and without changing configuration of existing Signaling System 7 (SS7) infrastructure, without substantially increasing OPEX and capital expenditure (CAPEX) for the operator, and/or without adding complexity on the operator backend provisioning system are further desired.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure provide systems and methods that address the issue of supporting features and services across different wireless network domains (sometimes referred to herein as simply networks or domains) without interfering with a user's experience. Exemplary systems and methods addresses the problem by using standard Mobile Application Part (MAP) and Diameter messages between synchronization nodes and databases, such as HLR and HSS, in the respective domains. Exemplary systems and methods addresses the problem by using standard Simple Object Access Protocol (SOAP) messages between synchronization nodes and Provisioning system. Exemplary systems include one or more—e.g., two (2) synchronization nodes, such as a Telephony Application Server (TAS) and a Provisioning-Gateway (PG) or ProvGw node, which is also referred to herein as a communication system synchronization node. Exemplary systems include Wifi as the access technology by the end user to access the 4G IMS. Exemplary systems and methods do not require any configuration changes on a Signaling System 7 (SS7) infrastructure.

Figure 1:
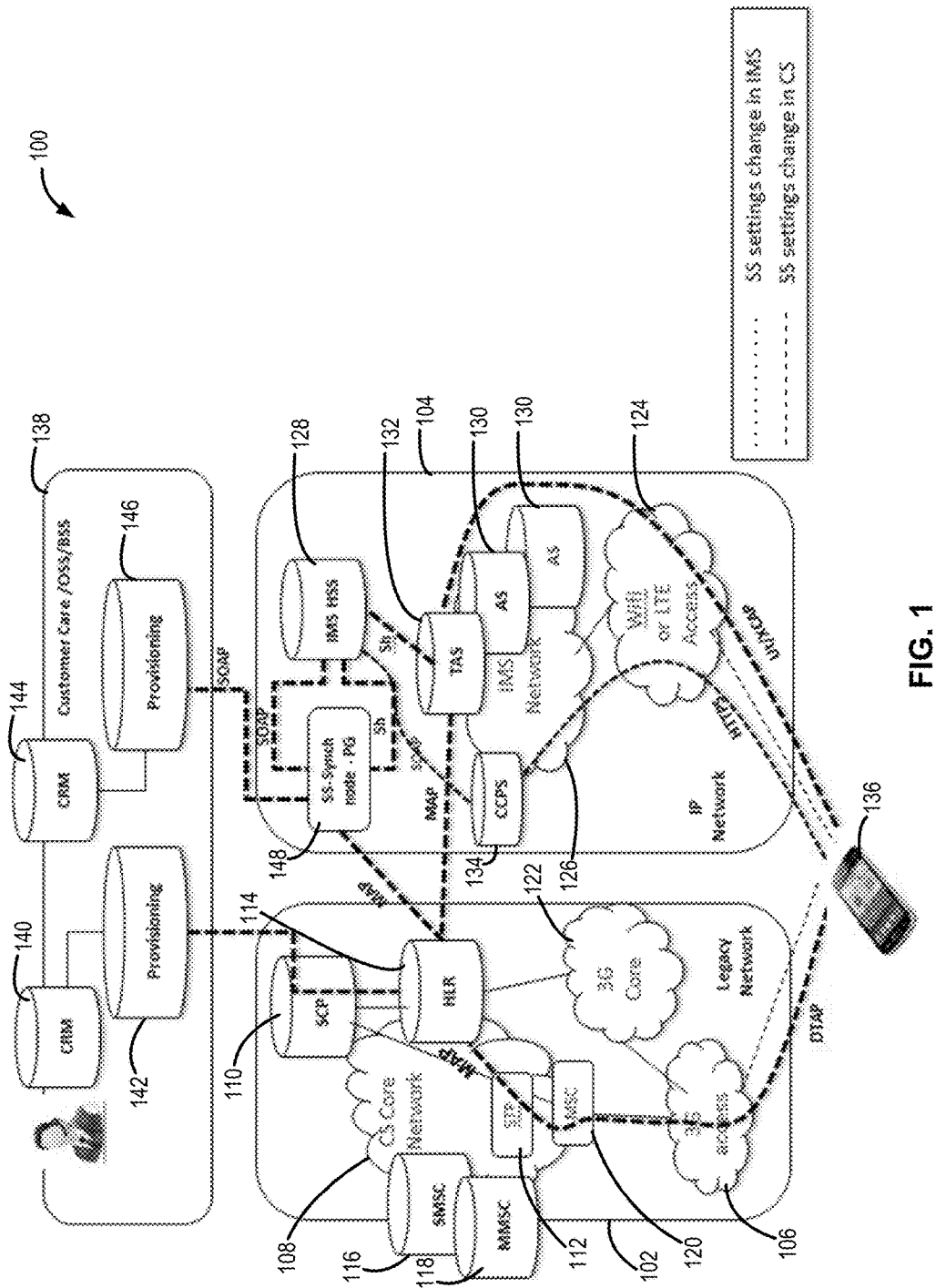
FIG. 1 illustrates a system for synchronizing supplementary services settings across different wireless network domains in accordance with exemplary embodiments of the disclosure.

Turning now to the figures, FIG. 1 illustrates a system 100 in accordance with at least one embodiment of the disclosure. System 100 includes a circuit switched (CS) network 102 (also referred to herein as a domain) and a packet switched (PS) network or domain 104.

CS network 102 includes a CS access network 106 (e.g., a 2G and/or 3G access network), a CS core network 108 to, for example, deliver GSM/UMTS services, such as voice calls, short message service, and circuit-switched data calls. CS core network 108 includes Intelligent Network (IN) SS7 nodes such as Service Control Point (SCP) 110 and Signaling Transfer Point (STP) 112. SCP 110 is primarily a database that provides information for advanced call processing capabilities. STP 112 is a router or switch for signaling messages in the SS7 network.

CS network 102 also includes a Home Location Register (HLR) 114. HLR 114 contains a master copy of the subscriber profile database. The data stored in HLR 114 include data such as Mobile Subscriber Integrated Service Digital Network (MSISDN) number, International Mobile Subscriber Identity (IMSI) number, Subscriber Identity Module (SIM) card details, service selections, and General Packet Radio Service Tunneling (GPRS) as well as Universal Mobile Telecommunications System (UMTS) settings. HLR 114 also includes supplementary service settings (also referred to herein as SS data) associated with the subscriber, including settings for multi-party service (MPTY), explicit call transfer (ECT), call deflection (CD), call forwarding (CF), call hold (CH), call barring, and the like. CS core network 108 also includes the Short Message Service Center (SMSC) 116 and Multimedia Messaging Service Center (MMSC) 118 that handle the processing and services for Short Messages Service (SMS) and Multimedia Service (MMS).

CS network 102 further includes the Mobile Switching Center (MSC) 120, which is the primary service delivery node for GSM, UMTS, and CDMA in the CS domain and is responsible for routing, for example, voice calls, SMS, and circuit-switched data. CS network can also include a 3G core network 122.

PS network 104 includes an access network 124 (e.g. and Evolved Packet Core (EPC), WIFI, and/or LTE access network) and IP Multimedia Subsystem (IMS) 126. Access network 124 can include, for example, an Evolved UMTS Terrestrial Radio Access Network (E-UTRAN). The EPC may include a Mobility Management Entity (MME), a Serving Gateway (SGW), and a Packet Data Network (PDN) Gateway (PGW). These network elements are known in the art and defined in the standards (e.g., the Third Generation Partnership Project (3GPP) standards).

IMS network (also referred to herein as simply IMS) 126 is a network that primarily uses Session Initiation Protocol (SIP) to deliver IP multimedia services. IMS network 126 includes Call Session Control Function (CSCF) servers (Interrogating-CSCF, Proxy-CSCF, and Serving-CSCF; not explicitly illustrated in FIG. 1) and an IMS Home Subscriber Server (HSS) 128, which includes a master copy of the subscriber profile database that contains subscriber and service-related information. HSS 128 contains, for example, the IP Multimedia Public User Identity (IMPU), IP Multimedia Private User Identity (IMPI), IMSI, MSISDN, subscriber service profiles, service triggers, and other information. HSS 128 supports IMS network 126 entities that handle calls. HSS 128 also provides support functions in mobility management, call and session setup, user authentication, and access authorization.

PS network 104 also includes one or more Application Servers (AS) 130 associated with IMS network 126; ASs 130 are SIP servers that provide the functionalities of hosting and executing various services and application functions. Any particular AS 130 can provide specific services to the subscriber, which may include multiparty gaming, videoconferencing, messaging, community services, presence, and content sharing.

IMS network 126 also includes a Telephony Application Server (TAS) 132. TAS 132 typically includes the service logic that provides the basic call processing services including digit analysis, routing, call setup, call waiting, call forwarding, conferencing, and the like. TAS 132 preferably supports rich multimedia services such as HD voice and video calling to subscribers on LTE, Wi-Fi, Fixed or Business networks, as well as the integrated mobility features to enable service continuity to move from one access network to another. PS network 104 and/or IMS network 126 can also include a client configuration provisioning server 134.

CS network 102 and PS network 104 can be accessed by a User Equipment (UE) 136. Examples of an UE 136 include a cellular phone, a smart phone, a session initiation protocol SIP phone, a laptop, a personal digital assistant PDA, a satellite radio, a global positioning system, a multimedia device, a video device, a digital audio player e.g., MP3 player, a camera, a game console, or any other similar functioning device. UE 136 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

UE 136 can include an application or client to perform various function described herein. An OTT WIFI client is used to describe illustrative examples. However, a native client, a VoLTE client, or other application or client can suitably be employed.

It should be noted that UE 136 can reach access network 124 using E-UTRAN and other access technologies, such as those specified by 3GPP. Existing 3GPP radio access networks are also supported. 3GPP specifications define how the interworking is achieved between an E-UTRAN LTE and LTE-Advanced, GERAN radio access network of GSM/GPRS and UTRAN radio access network of UMTS-based technologies WCDMA and HSPA.

An Evolved Packet Subsystem (EPS) allows non-3GPP technologies to interconnect the UE and the EPC. The term "non-3GPP" means that these access technologies were not specified in the 3GPP. These include, e.g., WiMAX, cdma2000, WLAN and fixed networks. Non-3GPP access technologies can be further classified as "trusted" and "untrusted" access networks. Trusted non-3GPP accesses can interface directly with the EPC. However, untrusted non-3GPP accesses interwork with the EPC via a network entity called the Evolved Packet Data Gateway (ePDG). The main role of the ePDG is to provide security mechanisms such as IP Security (IPsec) tunneling of connections with the UE over an untrusted non-3GPP network access, such as CDMA and WLAN technologies.

It may be seen from the foregoing that HLR 114 in CS core network 102 and HSS 128 in the IMS 126 are the network nodes or entities that store the subscriber profile databases. These databases are also used to store master copies of supplementary services settings (SS data) for each subscriber. Accordingly, these two copies of the subscriber profile data and supplementary services settings are desirably synchronized to ensure that the user is serviced in a consistent way across both CS network 102 and PS network 104.

System 100 also includes a customer care (or Business Support Systems (BSS) and Operational Support Systems (OSS)) system 128. Customer care system 138 includes a CRM 140 and provisioning database 142 for CS network 102 and a CRM 144 and provisioning database 146 for PS network 104. Although separately illustrated, when the CS network provider and the PS network provider are the same, the respective CRM 140/144 and databases 142/146 can be combined.

System 100 also includes a communication system synchronization node 148 (also referred to herein as provisioning gateway (PG) or (ProvGw)) for synchronizing supplementary services settings in CS network 102 and PS network 104. As set forth in more detail below, communication system synchronization node 148 includes a first interface configured to transmit and receive messages to and from HLR 114, a second interface configured to send and receive messages to and from HSS 128, a third interface configured to communicate with an operator provisioning database 146, a synchronization function module configured to: receive a message, indicating a change to a supplementary service settings associated with a user, from HLR 114, via the first interface; send an acknowledgment, indicating receipt of the message from HLR 114, to HLR 114; send a message, indicating the change to a supplementary service settings associated with the user to HSS 128, via the second interface; and receive a response from HSS 128 indicative of successful supplementary service settings update in the HSS.

In accordance with various embodiments of the disclosure, communication system synchronization node 148 is configured to (1) intercept messages between a UE and a provisioning database of a provider to facilitate setup of the synchronization of supplementary services settings, (2) update respective databases (e.g., HLR and HSS) in the CS and PS networks, and/or (3) provision any updates by a provider to databases (e.g., HLR and HSS) in the CS and PS networks.

A single communication system synchronization node 148 node is illustrated in the figures and used to describe the examples. However, multiple communication system synchronization nodes 148 can be used in systems and methods described herein. Traffic load balancing to communication system synchronization node 148 can be accomplished as follows: when subscribing for the SS data occurs when communication system synchronization node 148 sends MAP ATM to HLR, both communication system synchronization nodes 148 will use the same Alias GT, so that the MAP NSDM from HLR gets load shared across any available communication system synchronization node 148. Subscription will not be tied to a single communication system synchronization node 148 because if communication system synchronization node 148 goes down, the change notification will not be processed. STP will use 2 point codes associated with that GT in load share mode. PG is stateless and does not keep user state; hence any communication system synchronization node 148 can receive and process notifications from HLR 114. Both communication system synchronization nodes 148 use the same gsmSCF address.

Similarly, a single TAS node 132 is used to describe the examples, but the examples can also include or use multiple TAS nodes 132. Traffic load balancing to TAS nodes 132 can be accomplished by using a DNS-based routing that is implemented on the AGW. A common TAS FQDN is resolved at the AGW by DNS query. The DNS response can include a recode of multiple TAS ids with round robin, weighted load balancing or primary/secondary settings.

TAS 132 and communication system synchronization node 148 as separate network nodes are used to describe the exemplary embodiments of the disclosure; however exemplary embodiments can alternatively include a single node in the network combining both communication system synchronization node 148 and TAS 132 synchronization functionality, and can do the synchronization when changes happen in either wireless domain. The same interfaces and protocols and messaging used in the solution of separate PG and TAS apply to the single node solution. Further, although illustrated as part of network 104, communication system synchronization node 148 can be a stand-alone node or form part of another network.

Communication system synchronization node 148 is described as the node that will apply SS Synchronization from CS to WIFI domain. However, the solution also applies when communication system synchronization node 148 take the role to apply SS Synchronization from WIFI to CS. This can be achieved by HSS 128 sending SOAP update notification, or PNR, to communication system synchronization node 148 when TAS 132 updates the SS data of a subscriber on HSS. Once communication system synchronization node 148 gets the updated data from HSS 128, communication system synchronization node 148 can then update HLR 114.

Figure 2:
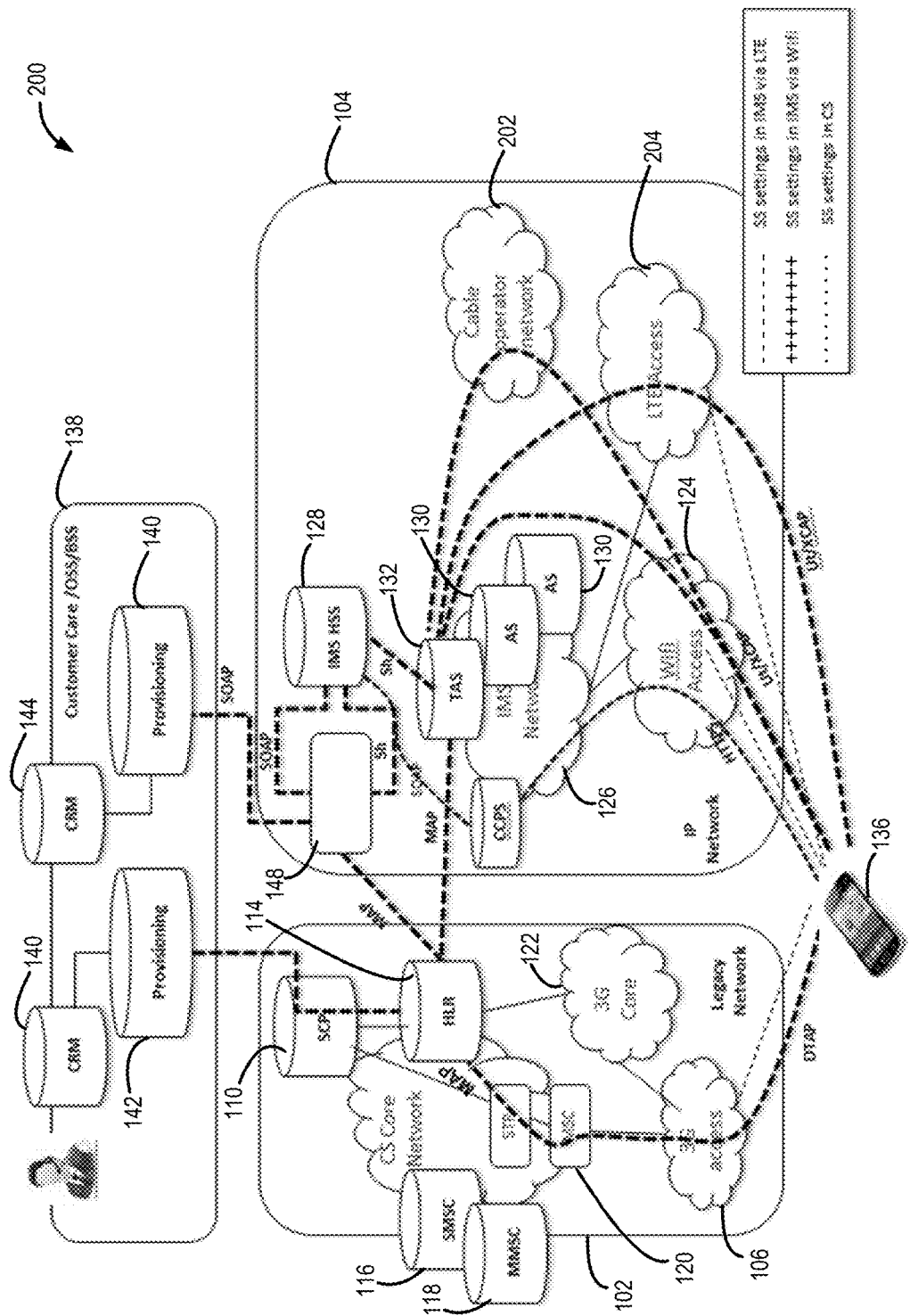
FIG. 2 illustrates another system for synchronizing supplementary services settings across different wireless network domains in accordance with exemplary embodiments of the disclosure.

FIG. 2 illustrates another system 200 in accordance with exemplary embodiments of the disclosure. System 200 is similar to system 100, except system 200 includes a cable operator network 202 and an LTE access network 204. Cable operators and/or LTE network operators may provide customer care, OSS, and/or BSS as described herein—e.g., in connection with customer care system 138.

By way of general examples, during an initial client setup of a supplementary services synchronization (e.g., using system 100 or system 200), communication system synchronization node 148 will setup notification request on HLR 114 for that subscriber and for SS data changes. When the user updates his/her SS data in CS network 102, HLR 114 will send the notification to communication system synchronization node 148, which in turn will update HSS 128, which in turn will update TAS 132.

When a user changes his/her SS data under PS network 104 (e.g., WIFI), TAS 132 will intercept the change request over the Ut interface, and will update HLR 114 and HSS 128 using MAP and Diameter Sh interfaces. HLR 114 in turn will update MSC 120.

The illustrative examples describe that during client setup, communication system synchronization node 148 will send an ATSI to HLR 114 to pull the CFU data for that subscriber. This is done because the MAP RD service does not include the CFU supplementary service when a certain MAP version is implemented on HLR 114. Exemplary embodiments can also apply if a MAP version is implemented on the HLR that include CFU data in the MAP RD. In that case, MAP ATSI is not needed from communication system synchronization node 148 to HLR 114 after a MAP RD.

WIFI as the access radio technology is used to describe the examples, but the examples also applies to LTE access or any IP based access network that connects to the IMS P-CSCF/SBC node.

In the illustrated examples, SOAP is used as a protocol interface for provisioning, however the solution can apply to any provisioning protocol between the operator backend provisioning system and the Synchronization Server PG.

In the examples, MAP ATM is used during the client setup to setup notifications on HLR 114 by communication system synchronization node 148. The solution presented herein also applies in the case where communication system synchronization node 148 can be provisioned as gsmSCF for SS data notifications in the HLR 114 for VoWiFi subscribers. However, some operators and HLR 114 may not allow such provisioning, and it may be difficult to maintain as VoWIFI subscribers are deleted and added frequently.

Call Forwarding Unconditional (CFU) and Call Forwarding No Reply (CFNry) are used as examples in the detailed description call flows to illustrate the exemplary embodiments of the disclosure. The examples can also apply to all other SS data services including Call Forwarding Busy, Call Forwarding No Answer and Call Waiting, and the like. The latter may be dependent on the HLR MAP version that is implemented.

When SS data change occurs, the present examples describe that HLR 114 is updated first. However, the various aspects of the disclosure still apply whether HSS 128 or HLR 114 is updated first. HLR 114 is recommended to be updated first in case HLR 114 update fails, HSS 128 update will not have to be rolled-back.

Although Sh is used between communication system synchronization node 148 and HSS 128 to update SS data during backend Provisioning update requests in WIFI domain, exemplary systems and methods also apply if SOAP protocol is used instead.

Two wireless access domains/networks 102, 104 are used to describe the examples; however illustrative examples also apply to multiple IP-based access domains/networks. For instance, the user can use WIFI under WIFI coverage, then move to CS coverage, and then move to LTE coverage. The solution described herein can apply SS data synchronization in any of these domains and/or similar domains.

Although VoWIFI client is used to describe the solution, systems, nodes, and methods described herein can apply to any IP-based client that supports the same interfaces as described in the solution.

Although WIFI is used to describe the solution to access the IMS network, the solution also applies when the end user uses WIFI to access a Cable Operator Network which in turn accesses the IMS network.

Although during SS data updates under WIFI the solution defines TAS to update HLR and HSS, systems, nodes, and methods described herein can apply if TAS updates HLR, and PG updates HSS once it received Notification message NSDM from the HLR, as described in at least one of the figures.

Although the examples are illustrated with message ATSI used during client setup to pull the CFU data from HLR, systems, nodes, and methods described herein can apply if ATSI is not used and the CFU data is received on PG in the ISD message sent from the HLR.

Figure 3:
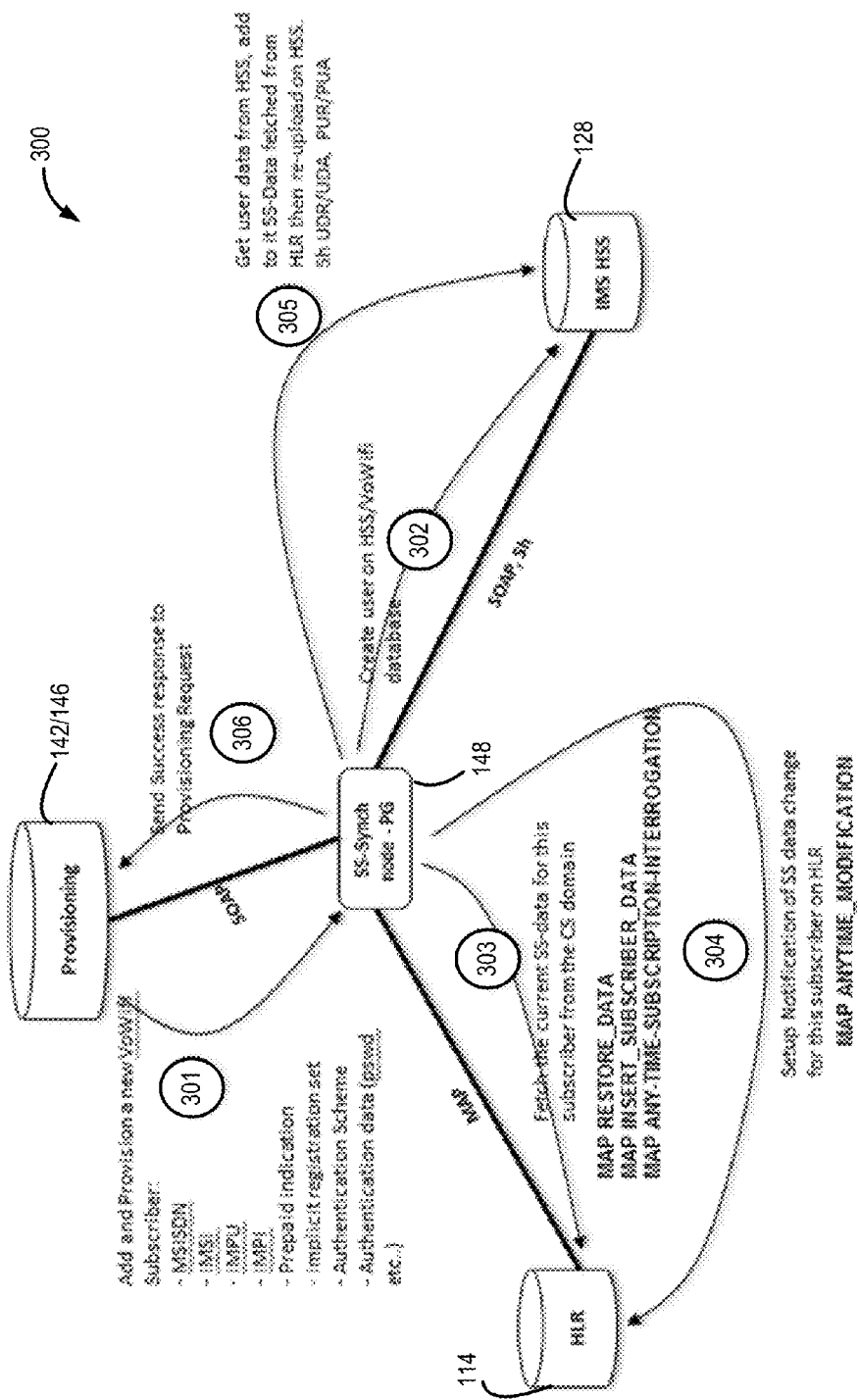
FIG. 3 illustrates a system and method for of supplementary services settings synchronization by operator provisioning across different wireless network domains in accordance with exemplary embodiments of the disclosure.

Turning now to FIGS. 3 and 9A-9D, a method of provisioning a synchronization process for supplementary service settings is illustrated. FIG. 3 illustrates a portion 300 of systems 100 and 200 FIGS. 9A-9D illustrate an exemplary message flow diagram. Elements and nodes in the flow diagrams, such as UE, ProvGw, HSS, HLR, and the like can be the same or similar to elements and nodes described in connection with FIGS. 1 and 2.

As discussed in more detail below, during the provisioning of services, a synchronization node (e.g., synchronization node 148) can intercept a message between a UE and a provider backend to facilitate setup of synchronization of the supplementary services settings—e.g., during activation or during initial provisioning. Although illustrated with a user requesting a download, the method could alternatively begin with a manual provisioning.

With reference to FIG. 3, an operator initially provisions a new subscriber (step 301). Information, including MSISDN, IMSI, IMPU, IMPI, Prepaid indication, Implicit registration set, Authentication Scheme, SIP DIGEST "default" pswd associated with a user, and the like, is sent to communication system synchronization node 148 (step 301). Next, user information is created on HSS 128 (step 302). Current SS data for a user is retrieved from HLR 114 (step 303). A notification of changes for a subscriber on HLR 114 is setup (step 304). And, in step 305, user data from HSS 128 is retrieved, added to the SS data retrieved from HLR 114, and then uploaded to HSS 128 (step 305).

With reference to FIGS. 9A-9D, an exemplary message flow diagram suitable for performing the method described in connection with FIG. 3 is illustrated. The initial provisioning method for adding a subscriber to the synchronization service begins with a UE 950 (e.g., US 136) requesting a URL from an HTTP server 960 (step 901) to download a client or an application. HTTP server 960 then returns a response, including, for example, VoWIFI client data file download (step 902). UE 950 then submits an authentication request to an Operator Backend (step 903). The Operator Backend (e.g., provisioning database 142/146) then sends a message to ProvGw 958 (e.g., communication system synchronization node 148). As shown, the message can include—MSISDN, IMSI, IMPU, IMPI, Prepaid indication, Implicit registration set, Authentication Scheme, SIP DIGEST "default" pswd associated with a user, and the like (step 904). This step can be triggered by an operator or by a client application or client. ProvGw 958 then sends a message to create a user on HSS 962 (e.g., HSS 128) (step 905) and HSS 962 sends a response (step 906). ProvGw 958 then sends a fetch request to get the current SS data for a subscriber from the CS network be sending a message to HLR 964/114 (step 907, which corresponds to step 301 in FIG. 3) and HLR 964/114 sends a message (step 908) with MAP Onsert-Subscriber Data (step 908). Multiple ISD's may be sent from HLR to cover all the SS data. MAP ISD's may be sent in parallel or after response is received for the previous MAP ISD request (step 909). ProvGw 958 sends an MAP ATSI (Requested Info (SSCode=CFU)) (step 910). As CFU data cannot be extracted from ISD, ATSI is used. Also, ATSI response will include MSISDN, which is used by ProvGw 958 to derive IMPU and query HSS 962. If not supported, ProvGw 958 can get the IMPU/MSISDN from the earlier received SOAP request message in this procedure. HLR 964 then sends a MAP ATSI Ack (Current CFU data) (Step 911) and RESTORE-DATA Resp (step 912). ProvGw 958 sets up notifications in HLR 964. Explicit setup of notifications through MAP ATM can be optional if ProvGw 958 can be provisioned as gsmSCF for SS data notifications in the HLR for VoWiFi subscribers. ProvGw 958 sends a Send MAP ATM for all supplementary services with modifyNotificationToCSE=activate (step 913), and HLR 964 returns an acknowledgement (step 914). This notification tells HLR 964 to notify ProvGw 958 of any changes in the supplementary services settings. Multiple ATM messages may be used if HLR 964 does not support "SS-code=allForwardingSS (0x20)." Next, ProvGw 958 extracts user data from HSS 962 and adds to it SS data fetched from HLR 964, and then re-uploads the data on HSS 962 (steps 917-920).

ProvGw 958 then sends a message to operator backend 954 to enable HLR 964 to divert MT calls from CS network for a subscriber towards the VoWIFI TAS SCP (step 921). Operator backend 954 then sends a Set T-CSI (MSISDN, IMSI) message to HLR 964 (step 922). HLR 964 sends an acknowledgement back to operator backend 954 (step 923) and operator backend sends an authentication approved message to UE 950 (step 924).

A client on UE 950 then starts auto configuration/provisioning. UE send a DNS Request (CCPS FQDN) to DNS 956 (step 925). DNS 956 then sends a response (DNS Response (CCPS address)) to UE 950 (step 926). AN HTTP Request (Provisioning Request, MSISDN) is then sent to CCPS 952 (step 927). Alternatively, a MSISDN can be passed to CCPS as part of HTTP header Enrichment (step 928). MSISDN will be added in the request as part of HTTP Header Enrichment provided by operator network. This request occurs over the operator authenticated packet data network. The remaining steps (steps 929-935) of flow diagram 900 assist a user in a setup process, and are not new to a synchronization process as described herein.

As noted above, although illustrated with a VoWIFI initial provisioning, similar steps can be taken to initialize using a cable, LTE or similar services.

Figure 10A:
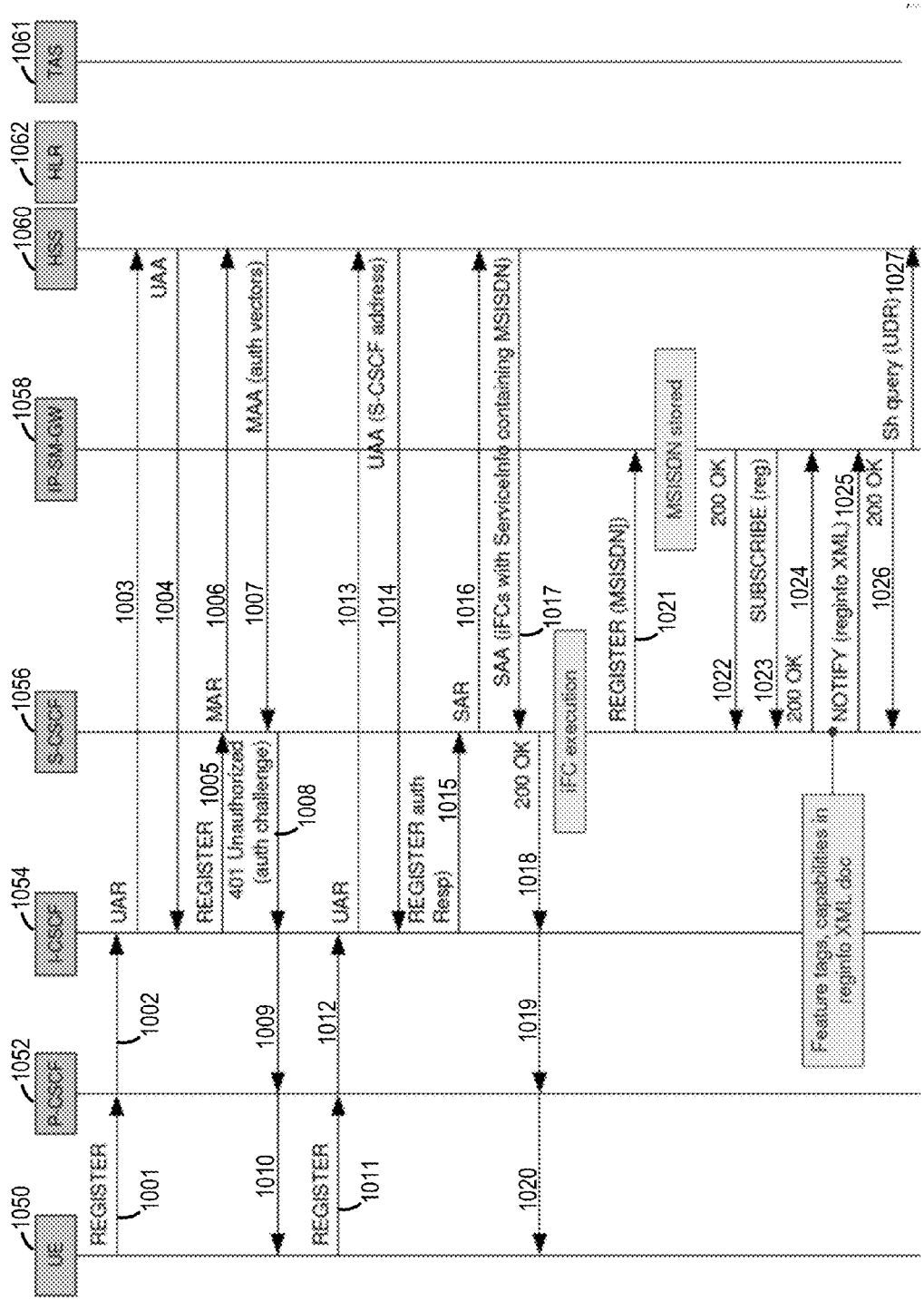
FIGS. 10A-10B illustrates a sequence diagram for a client registration of supplementary services settings synchronization on a packet-switched network in accordance with exemplary embodiments of the disclosure.
Figure 10B:
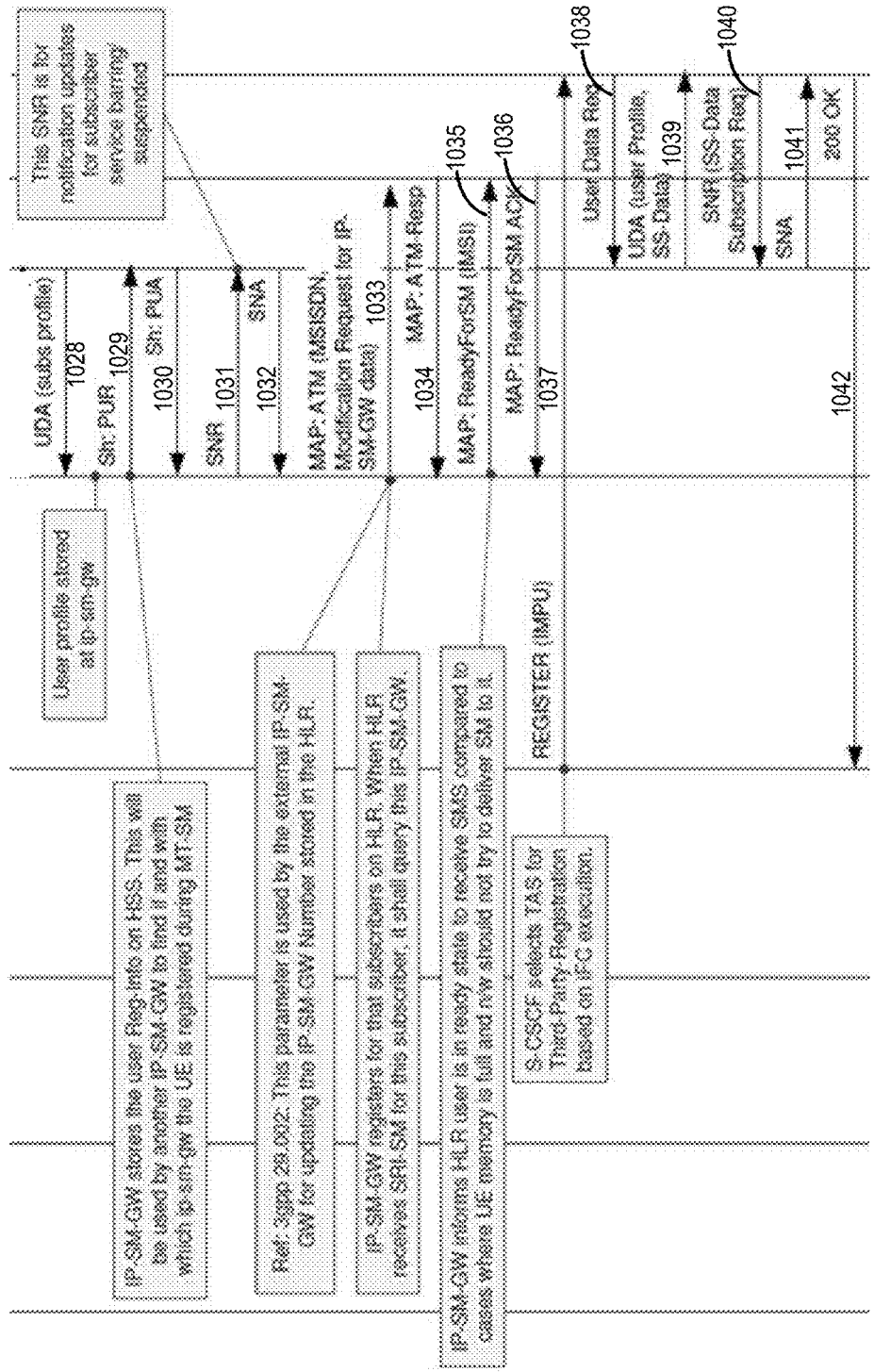

FIGS. 10A-10B illustrate a method of synchronizing services settings once a user has downloaded the application/client and is attached to an IMS network. Initially, a UE 1050 sends a register message to a P-CSCF 1052 (step 1001), which forwards the message to I-CSCF 1054 (step 1002). I-CSCF 1054 then sends a UAR message to HSS 1060 (step 1003), and HSS 1060 sends and acknowledgement back to I-CSCF 1054 (step 1004). Next, I-CSCF 1054 sends a register message to S-CSCF 1056 (step 1005), and S-CSCF 1056 sends a MARR message to HSS 1060 (step 1006) and HSS 1060 sends a MAA (auth vectors) message back to S-CSCF 1056 (step 1007). The authorization challenge is then returned to UE 1050 (steps 1008-1010). UE 1050 then registers with HSS 1060 (steps 1011-1020). Next, iFC execution is performed (step 1021) and MSISDN is stored (steps 1022-1024). Then, a notify message is sent from S-CSCF 1056 5o IP-SM-GW 1058 (step 1025), and acknowledgement is returned (step 1026), and a Sh query is sent from IP-SM-GW 1058 to HSS 1060 (step 1027) and a UDA (subs profile) message is returned (step 1028). IP-SM-GW 1058 stores the user Reg-Info on HSS 1060. This will be used by another IP-SM-GW to find if and with which ip-sm-gw the UE is registered during MT-SM (steps 1029-1030). An SNR is used for notification updates for subscriber service barring/suspended (steps 1031-1032). A Ref: 3gpp 29.002 parameter is used by the external IP-SMGW for updating the IP-SM-GW Number stored in the HLR. IP-SM-GW registers for that subscriber on HLR 1062. When HLR 1062 receives SRI-SM for this subscriber, it shall query this IP-SM-GW (steps 1033-1034). IP-SM-GW informs HLR user is in ready state to receive SMS compared to cases where UE 1050 memory is full and the network should not try to deliver SM to it (steps 1035-1036). Then, S-CSCF 1056 selects TAS 1064 for Third-Party-Registration based on iFC execution (steps 1037-1042).

Figure 4:
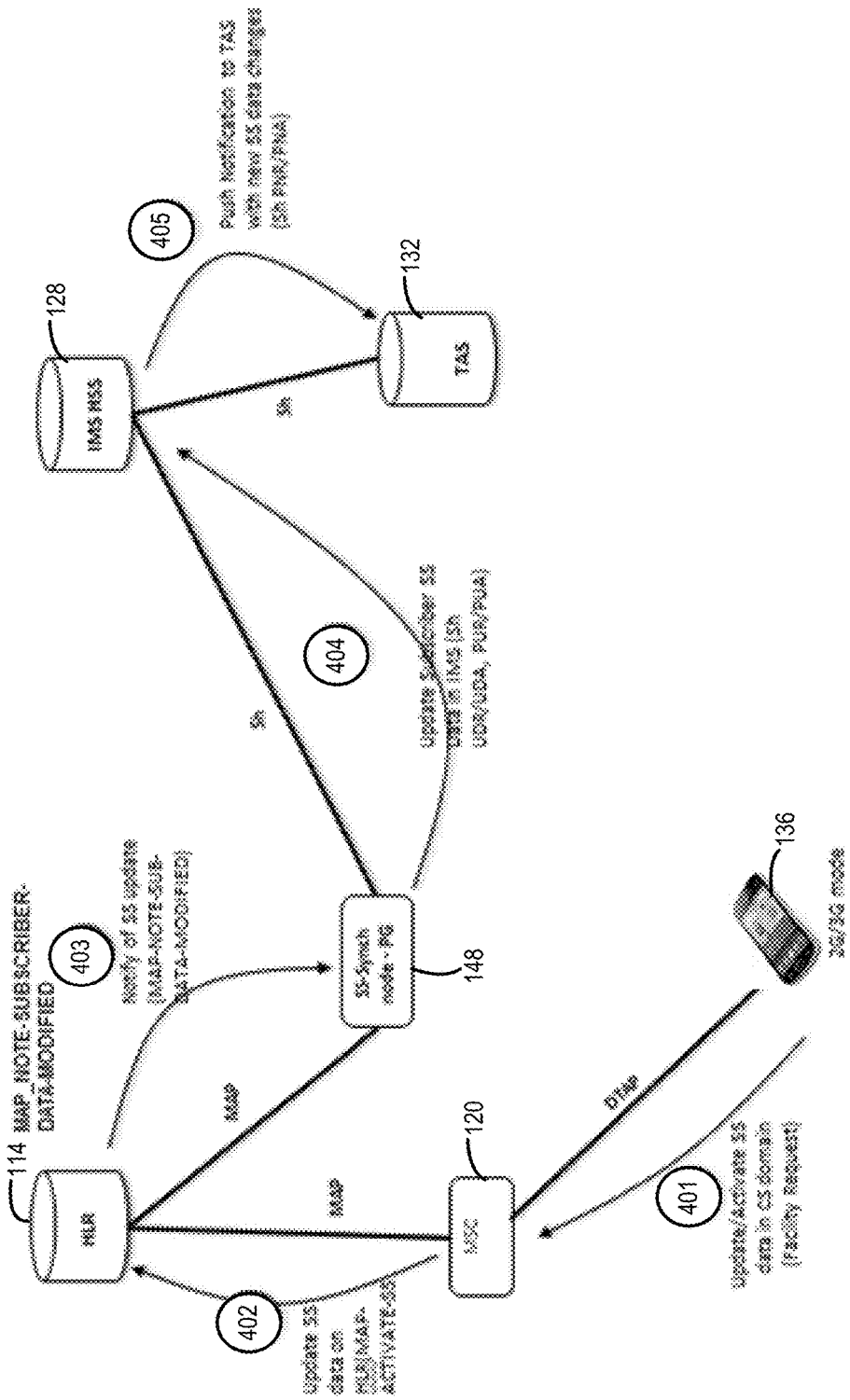
FIG. 4 illustrates a system and method for updating supplementary services settings in a circuit-switched network domain in accordance with exemplary embodiments of the disclosure.

FIG. 4 illustrates a process when UE 136 registered in a CS network (e.g., CS network 102). Step 401 includes sending an update to MSC 120, which sends the message to HLR 114 (step 402). These can be standard messages, known in the art. During the setup process, discussed above in connection with FIG. 3, HLR 114 was requested to notify communication system synchronization node 148 of any updates. So, in step 403, HLR 114 notifies communication system synchronization node 148 of any changes received in step 402. Communication system synchronization node 148 will then send the update to HSS 128 using, for example, a Sh interface (step 404). HSS 128, in turn, will update TAS 132 (step 405).

Figure 11A:
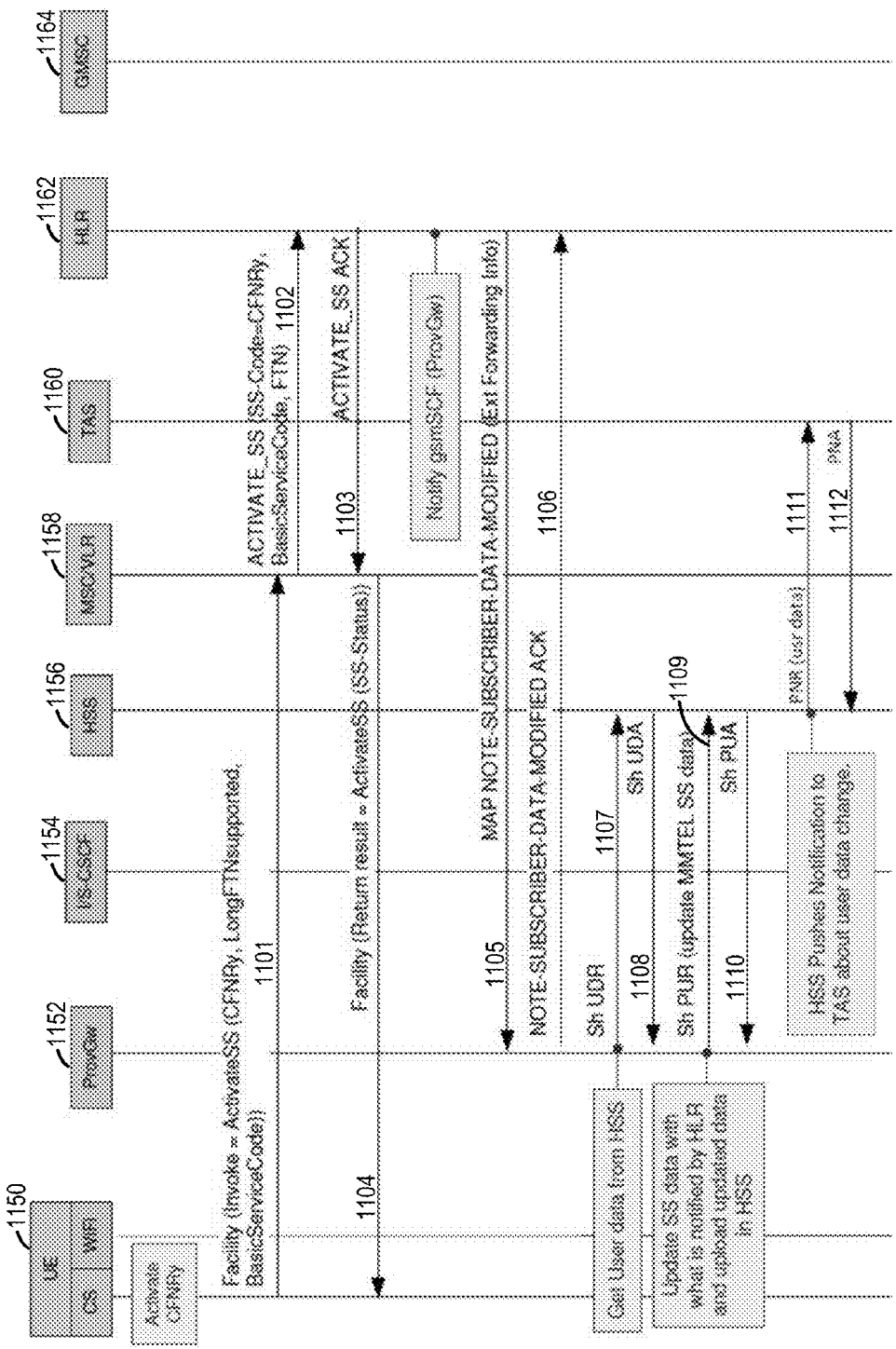
FIGS. 11A-11C illustrate a sequence diagram for modifying supplementary services settings in a circuit-switched network using a device registered in a packet-switched network in accordance with exemplary embodiments of the disclosure.
Figure 11B:
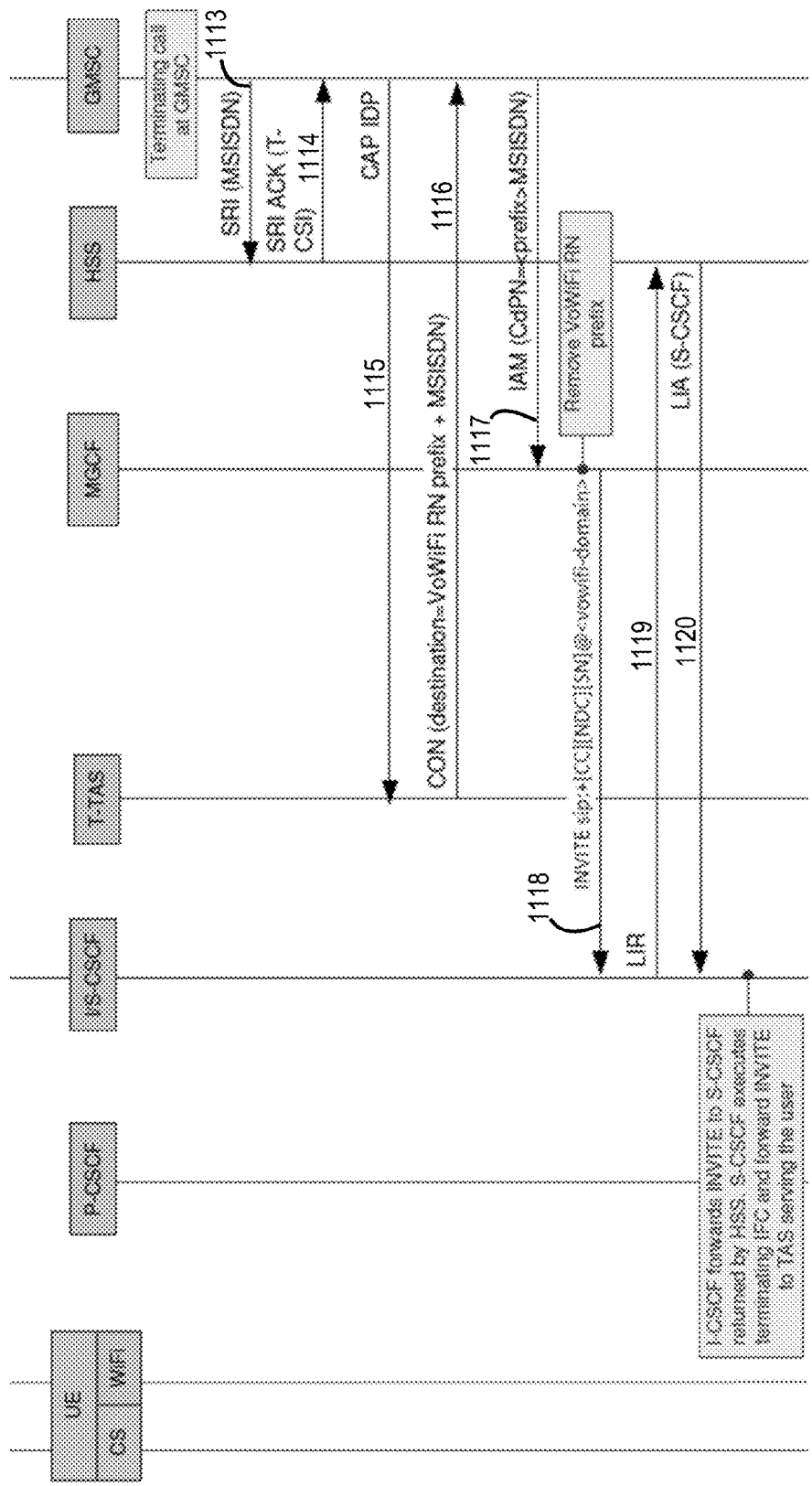
Figure 11C:
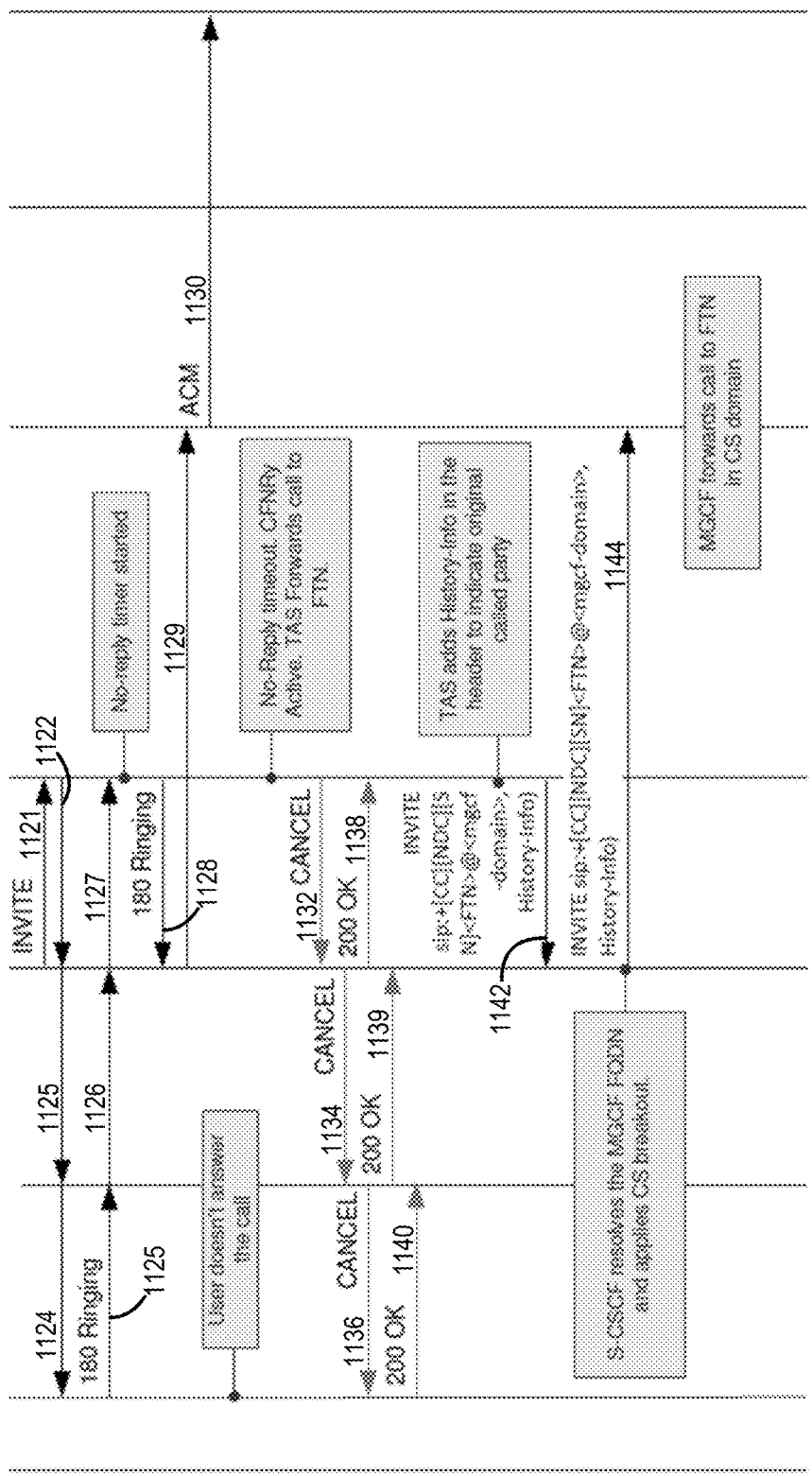

FIGS. 11A-11C illustrate a message flow diagram to implement the method illustrated in FIG. 4, illustrating that the SS data update is working in a PS network. In the illustrated example, the process begins with a Facility (Invoke=ActivateSS (CFNRy, LongFTNsupported,BasicServiceCode)) message from UE 1150 to MSC 1158 (step 1101). MSC 1158 then sends an ACTIVATE_SS (SS-Code=CFNRy, BasicServiceCode, FTN) message to HLR 1162 (Step 1102). HLR 1162 sends an ACTIVATE_SS ACK message to MSC 1158 (step 1103). MSC sends a Facility (Return result=ActivateSS (SS-Status)) message to UE 1150 (step 1104). At step 1105, HLR 1162 sends a MAP NOTE-SUBSCRIBER-DATA-MODIFIED (Ext Forwarding Info) message to ProvGw 1152. ProvGw 1152 then sends a NOTE-SUBSCRIBER-DATA-MODIFIED ACK to HLR 1162. In steps 1107-1110, ProvGw retrieves SS data from HSS 1156 and updates the SS data with what is notified by HLR 1162 and uploads updated data in HSS 1156. HSS 1156 then pushes the updated SS data to TAS 1160 (steps 1111 and 1112). The call can then be terminated (steps 1113-1116) and VoWIFI RN prefix can be removed (steps 1118-1120). Steps 1121-1144 can be performed as typically performed in a communication network.

Figure 5:
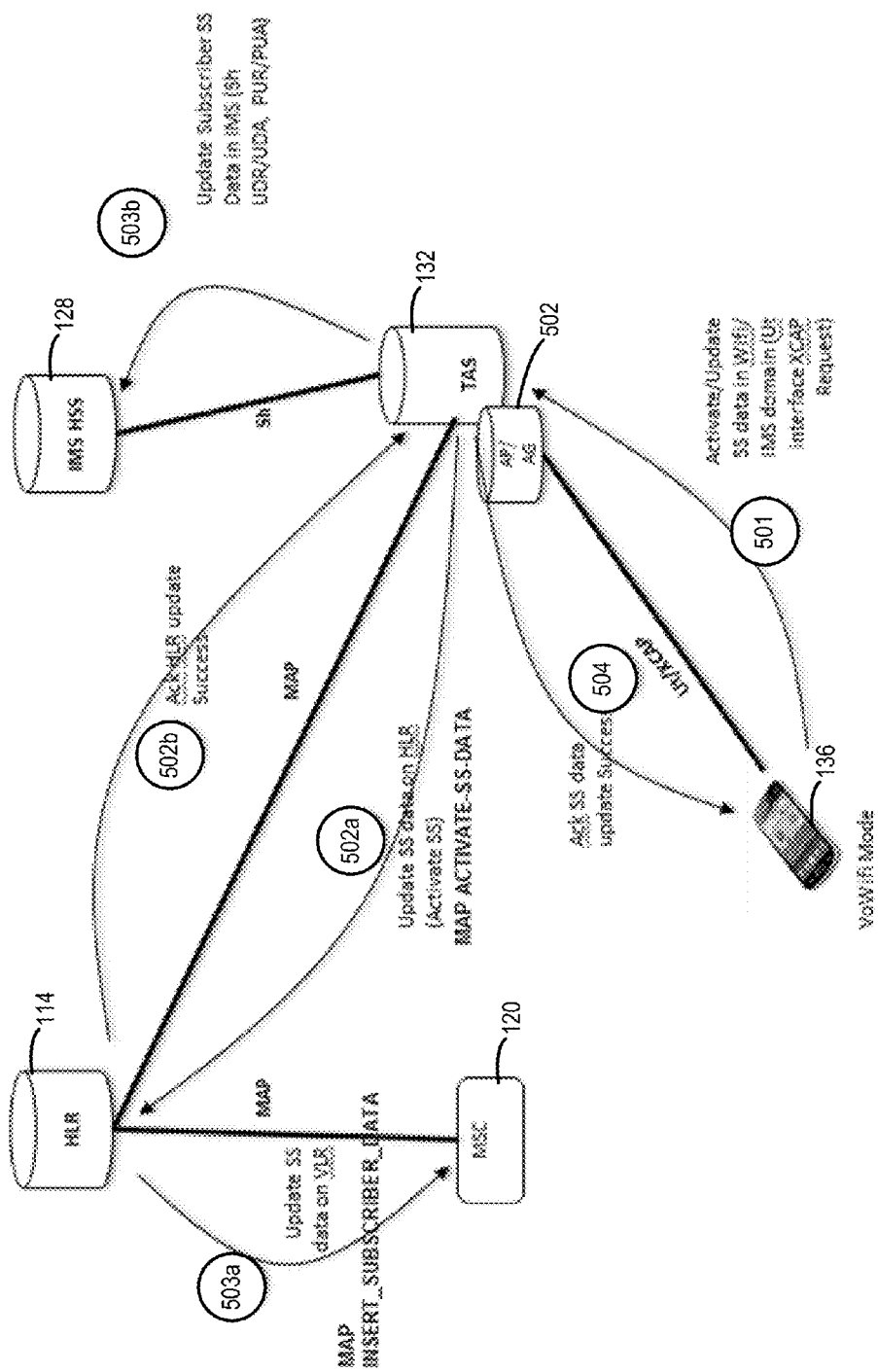
FIG. 5 illustrates a system and method for updating supplementary services settings in a packet-switched network domain in accordance with exemplary embodiments of the disclosure.

FIG. 5 illustrates a process for synchronizing services setting when a user is registered in a PS network. In step 501, UE 136 communicates with AP/AG 502 (e.g., using an Ut/XCAP interface) to update services settings on TAS 132. TAS 132 will then update SS data on HLR 114 (step 502*a*) and HLR 114 will send an acknowledgement to TAS 132 (step 502*b*). HLR 114 will update MSC 120 (step 503*a*) and TAS 132 will update HSS 128 (step 503*b*). An acknowledgement is then sent to UE 136 (step 4).

Figure 12A:
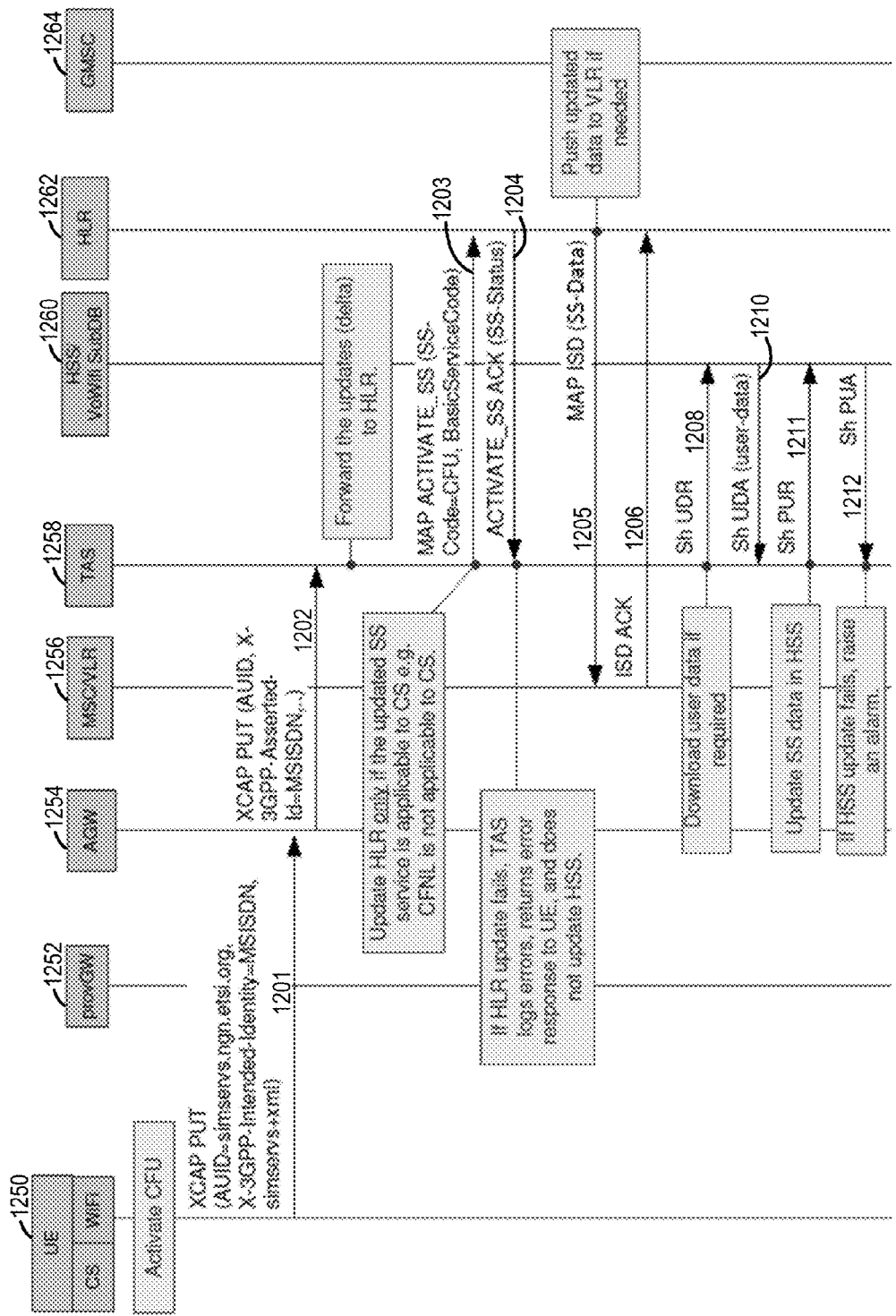
FIGS. 12A-12B illustrate a sequence diagram for modifying supplementary services settings in a packet-switched network using a device registered in a circuit-switched network in accordance with exemplary embodiments of the disclosure.
Figure 12B:
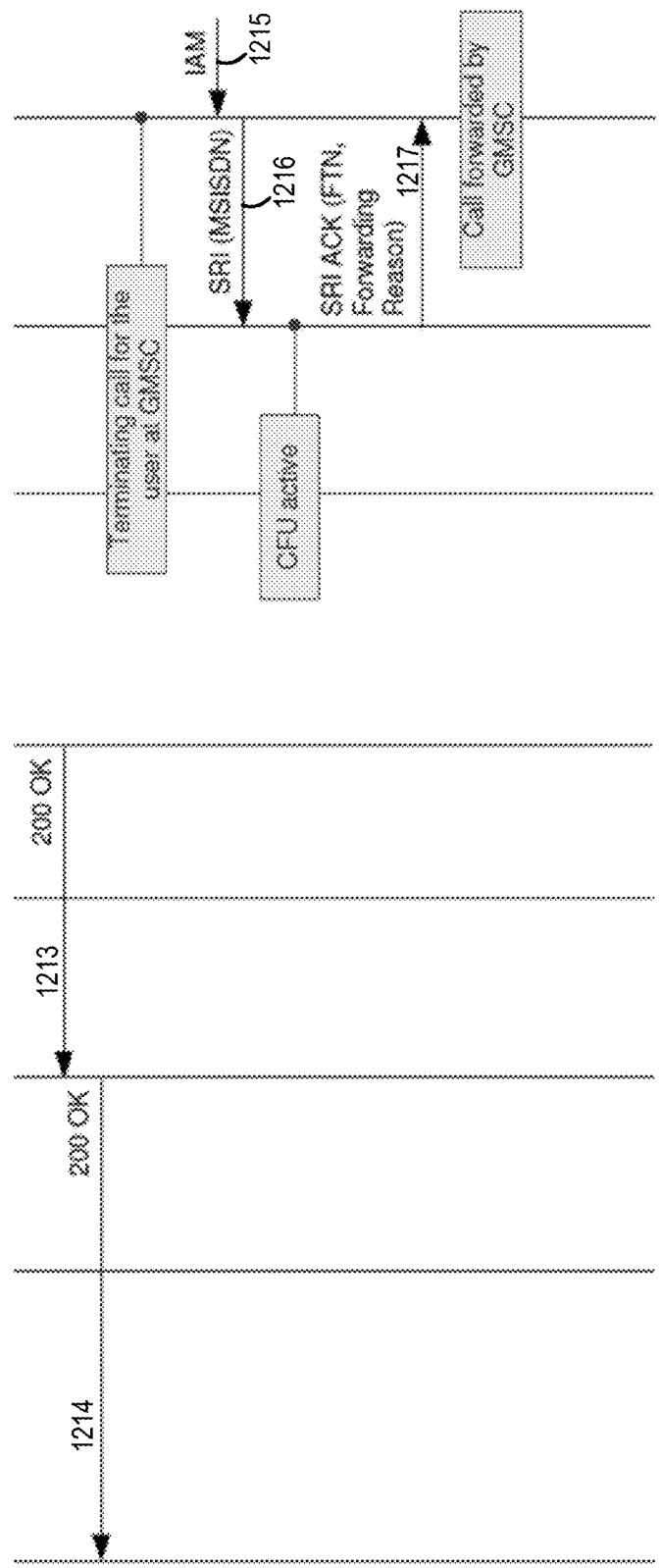

FIGS. 12A-12B illustrate a message flow diagram in accordance with exemplary aspects of the process illustrated in FIG. 5, where a user/subscriber updates SS data in a PS network. In the illustrated example, a CFU is activated by EU 1250 sending XCAP PUT(AUID=simservs.ngn.etsi.org, X-3GPP-Intended-Identity=MSISDN,simservs+xml) message to AWG 1254 (step 1201) and AGW 1254 sending a XCAP PUT (AUID, X-3GPP-Asserted-Id=MSISDN, . . . ) message to TAS 1258 (step 1202). Next, HLR 1262 is updated only if the updated SS data service is applicable to CS, e.g. CFNL is not applicable to CS (steps 1203-1204). If HLR update fails, TAS 1258 logs errors, returns error response to UE 1250, and TAS 1258 does not update HSS (step 1204). Next HLR 126 pushes updated data to MCS/VLR 1256, if needed (Steps 1205-1206). Next, user data is downloaded if required (steps 1208-1210). If the HSS update fails, an alarm can be sent (steps 1212-1214). Next, a call can be terminated (steps 1215-1216), and CFU can be activated (step 1217).

Figure 6:
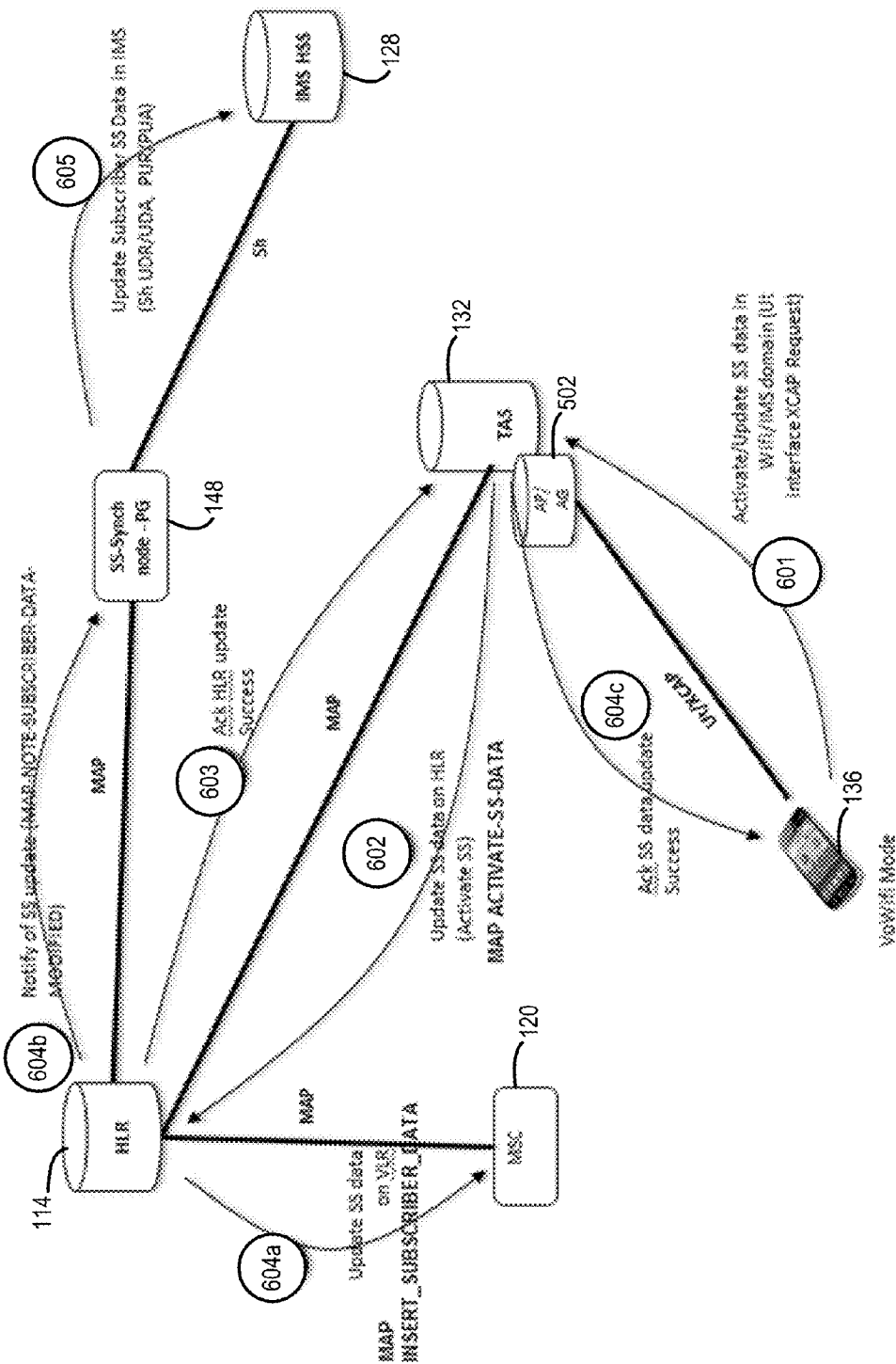
FIG. 6 illustrates another system and method for updating supplementary services settings in a packet-switched network domain in accordance with exemplary embodiments of the disclosure.

FIG. 6 illustrates another, preferred process for synchronizing services setting when a user is registered in a PS network. The illustrated process is similar to the process illustrated in FIG. 5. Step 601 can be the same as step 501 illustrated in FIG. 5. In step 602, only HLR 114 is updated with the SS update. In step 603, an acknowledgement is sent. HLR 114 has been notified to let communication system synchronization node 148 know of any changes HLR 114 receives. HLR 114 will update MSC 120, as described above (step 604*a*) and notify communication system synchronization node 148 (step 604*b*). Once communication system synchronization node 148 receives the SS update, communication system synchronization node 148 will perform the update on HSS (step 605). HSS 128 can optionally update TAS 132 (although TAS 132 has already been updated by UE 136).

Figure 13A:
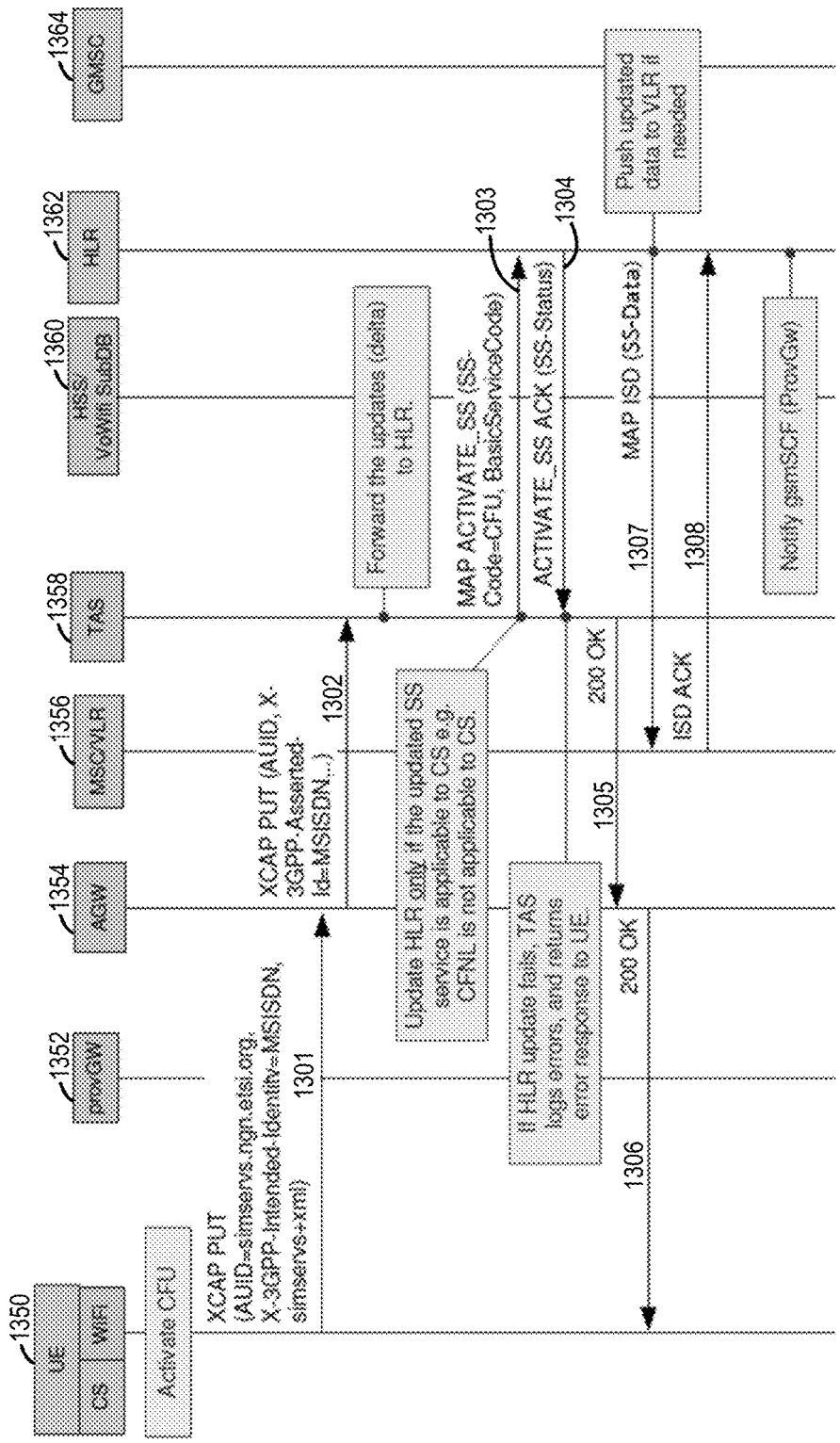
FIGS. 13A-13B illustrate a another sequence diagram for modifying supplementary services settings in a packet-switched network using a device registered in a circuit-switched network in accordance with exemplary embodiments of the disclosure.
Figure 13B:
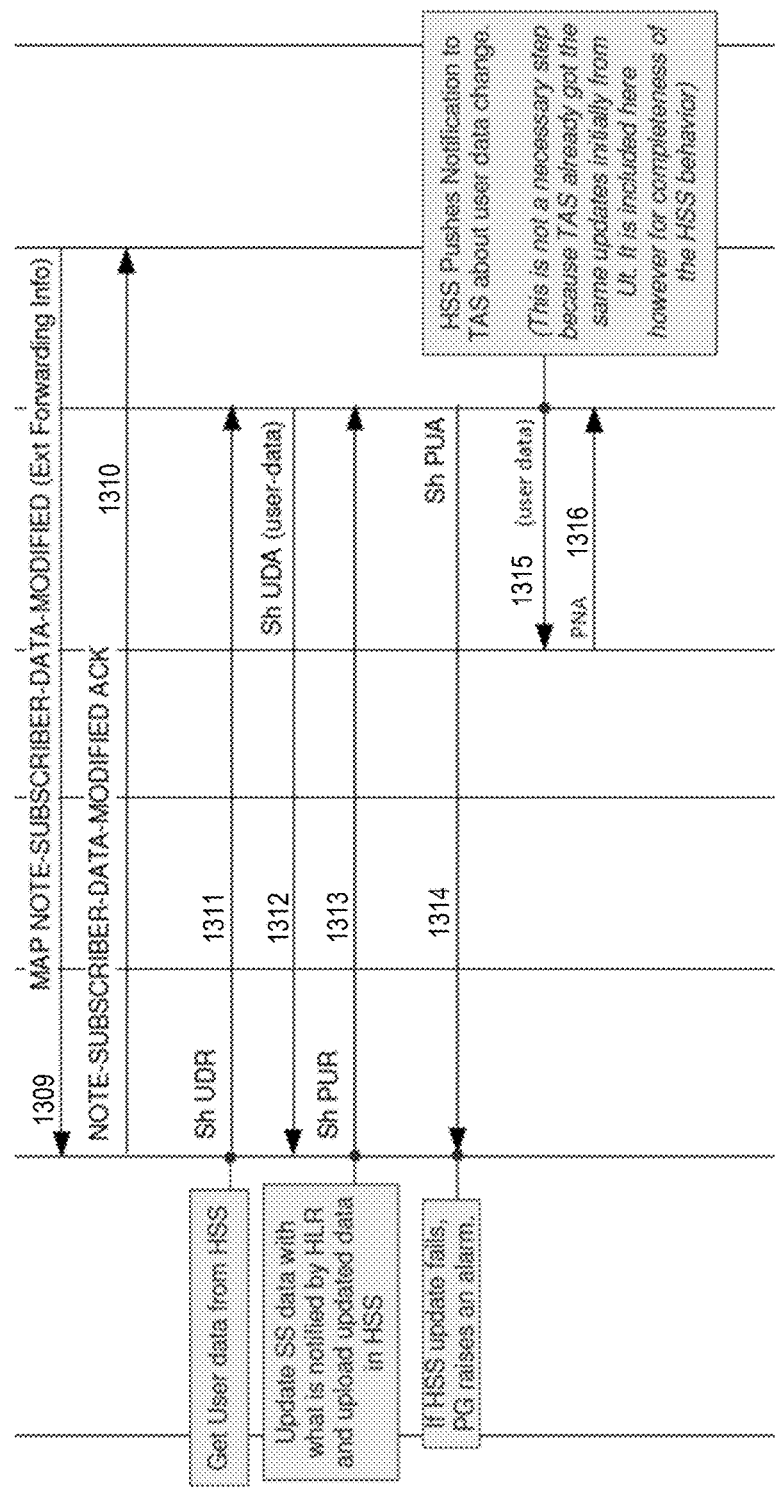

FIGS. 13A-13B illustrate a message flow diagram in accordance with exemplary aspects of the process illustrated in FIG. 6, where a user updates SS data in a PS network. In the illustrated example, CFU is updated by sending messages from UE 1350 to AGW 1354 and from AGW 1354 to TAS 1358 (steps 1301 and 1302). Next, the updates are forwarded to HLR 1362 and OK messages are sent to AGW 1354 and UE 1350 (steps 1303-1306). Updates are then pushed to MSC/VLR 1356, if needed (steps 1307-1308) and ProvGw 1352 is notified and an acknowledgement is sent (steps 1309-1310). Next, user data is retrieved from HSS 1360 (step 1311), and SS data with what is notified by HLR 1362 is uploaded and updated data in HSS 1360 (steps 1312-1313). An alarm can be sent (step 1314) if the HSS update fails. Finally, HSS can update TAS 1358, although not necessary (steps 1315-1316).

Figure 7:
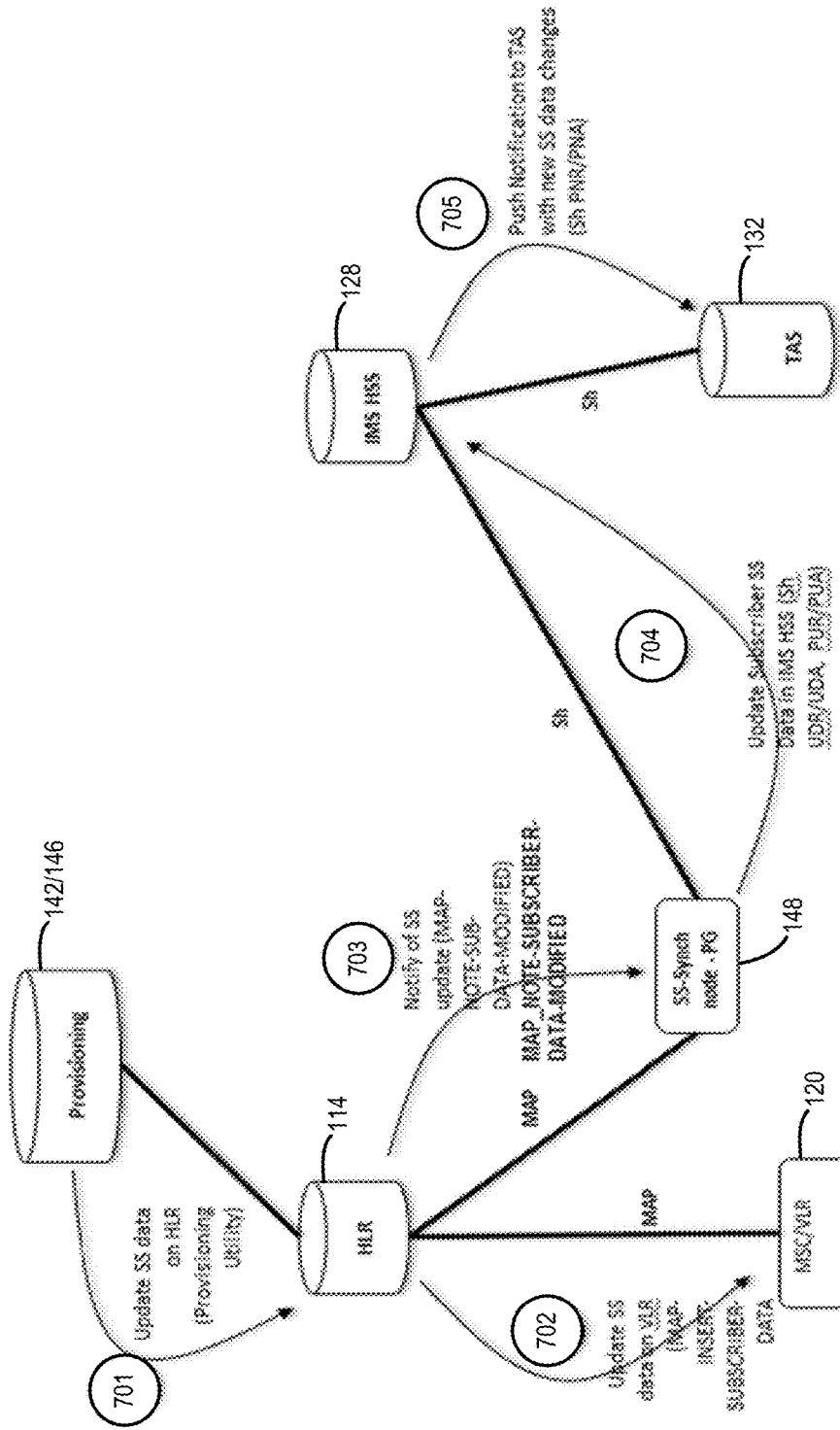
FIG. 7 illustrates a system and method for operator updating of supplementary services settings in a circuit-switched network domain in accordance with exemplary embodiments of the disclosure.

FIG. 7 illustrates a method of an operator providing updates to SS data in a CS network. In the illustrated example, a CS network HLR 114 is initially updated (step 701). HLR 114 then updates MSC 120 (step 702) and communication system synchronization node 148 (step 703). Communication system synchronization node 148 then updates HSS 128 (step 704), which updates TAS (step 705).

Figure 14A:
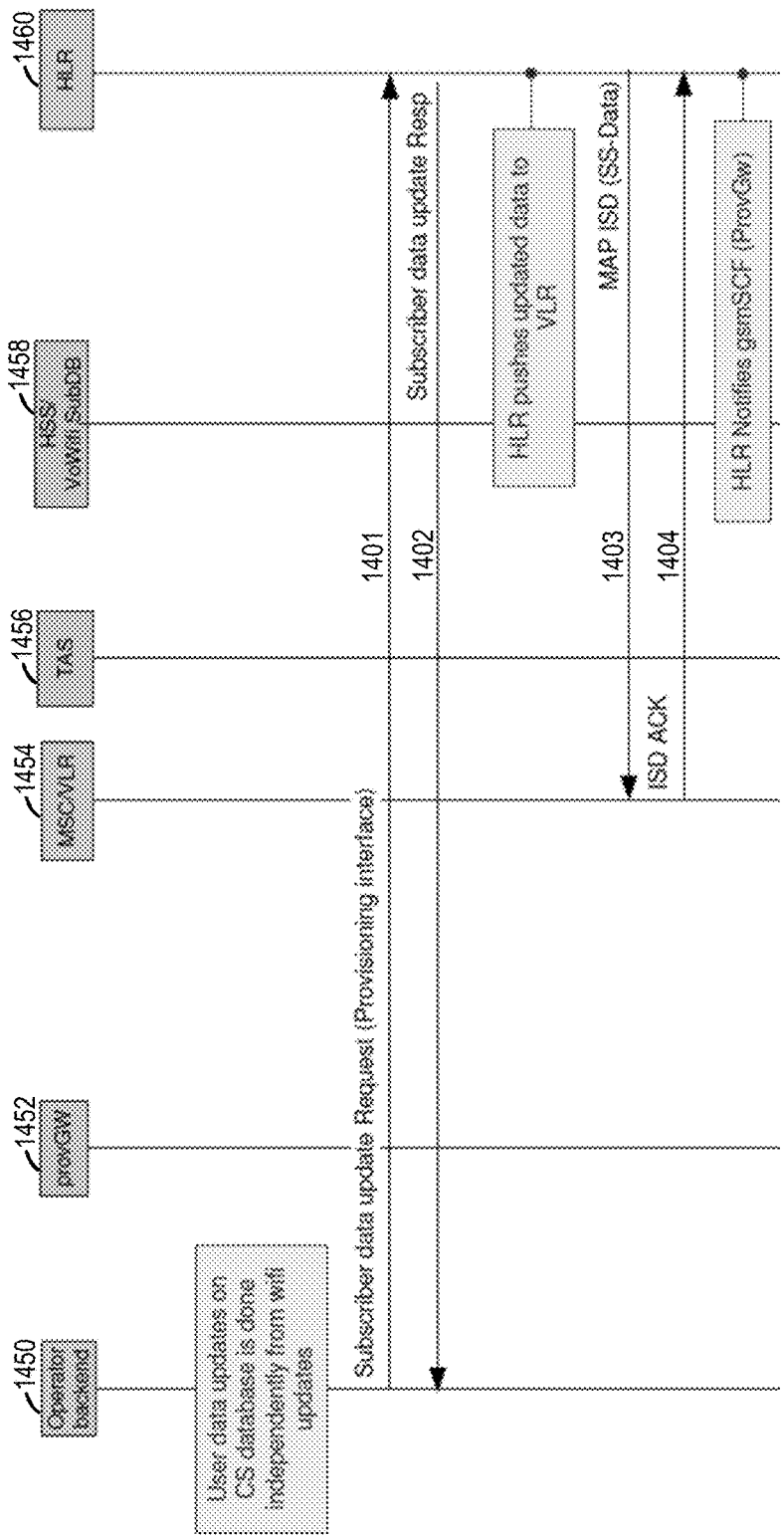
FIGS. 14A-14B illustrate a sequence diagram for modifying supplementary services by an operator of a circuit-switched network in accordance with exemplary embodiments of the disclosure.
Figure 14B:
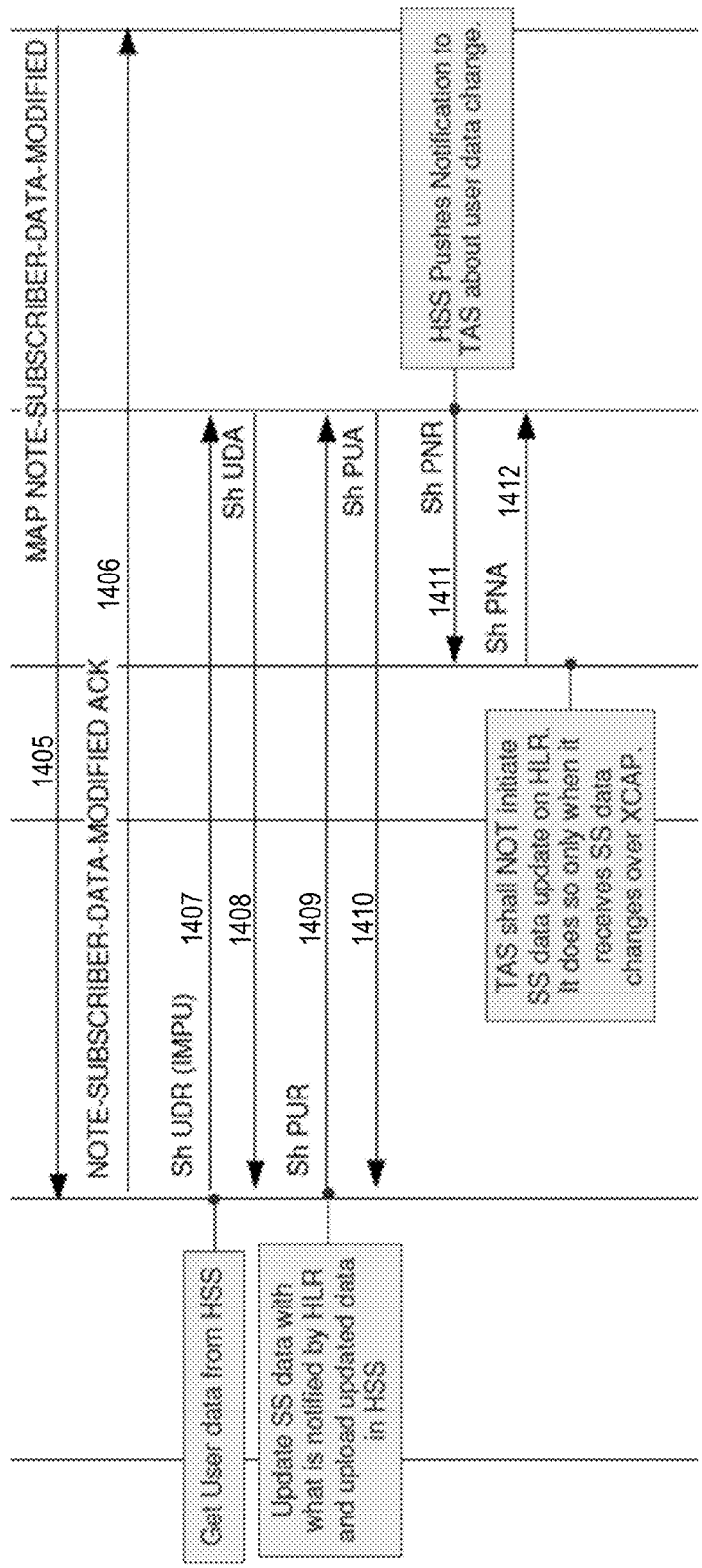

FIGS. 14A-14B illustrate an exemplary message flow for implementing the method illustrated in FIG. 7. In the illustrated example, the message flow begins with user data being updated on a CS database (HLR 1460) done independently from PS network updates and acknowledgement (steps 1401-1402). Next, HLR 1460 pushes update data to MSC 1454 and an acknowledgement is set (steps 1403-1404). Then, HLR 1460 notifies ProvGw 1452 of the changes and an acknowledgment is sent (steps 1405-1406). Then, user SS data is retrieved from HSS 1458 (steps 1407-1408). Then, updated SS data is updated and uploaded in HSS 1458 (steps 1409-1410). Next, HSS 1458 pushes a notification to TAS 1456 (steps 1411-1412).

Figure 8:
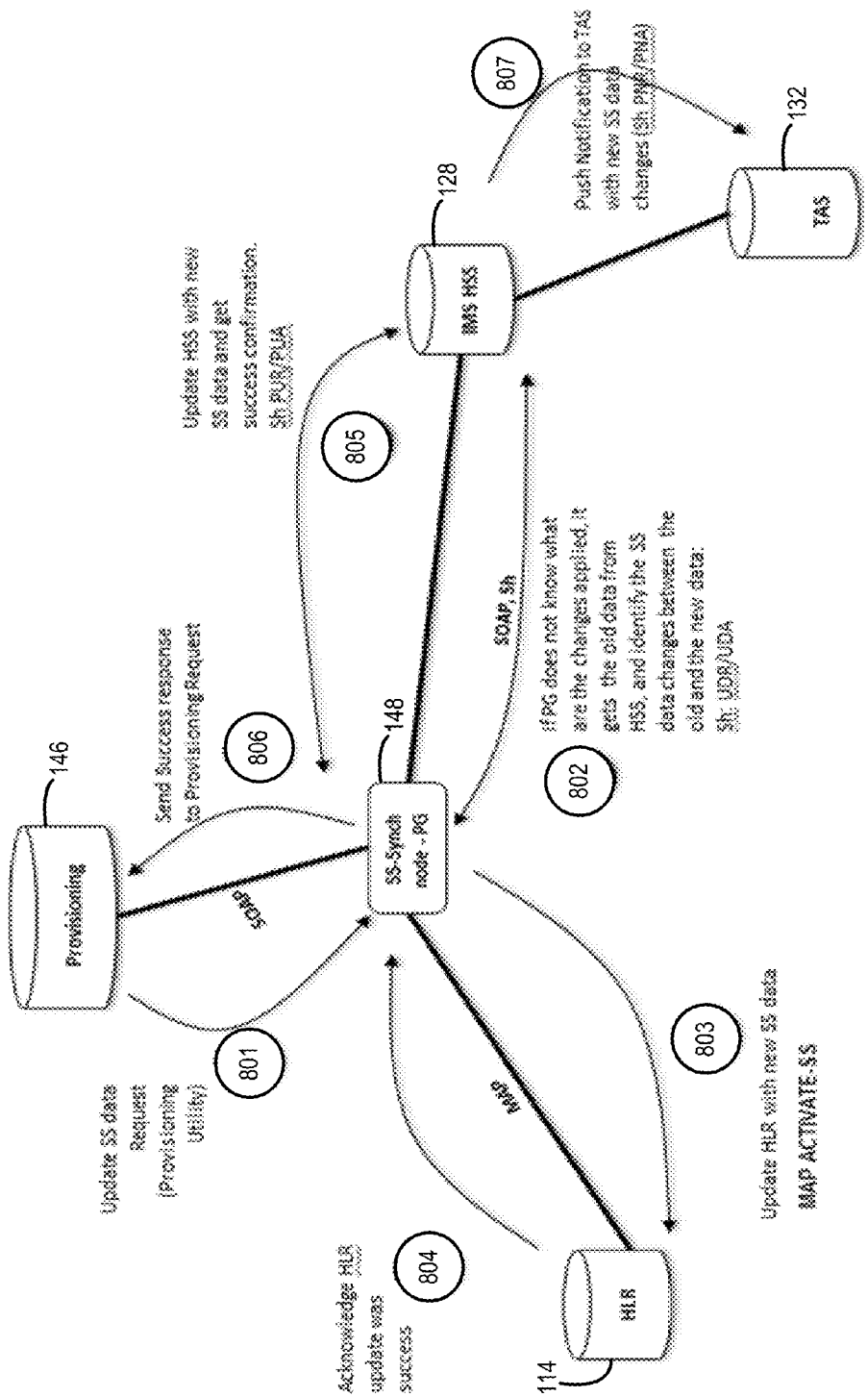
FIG. 8 illustrates a system and method for operator updating of supplementary services settings in a packet-switched network domain in accordance with exemplary embodiments of the disclosure.
Figure 9A:
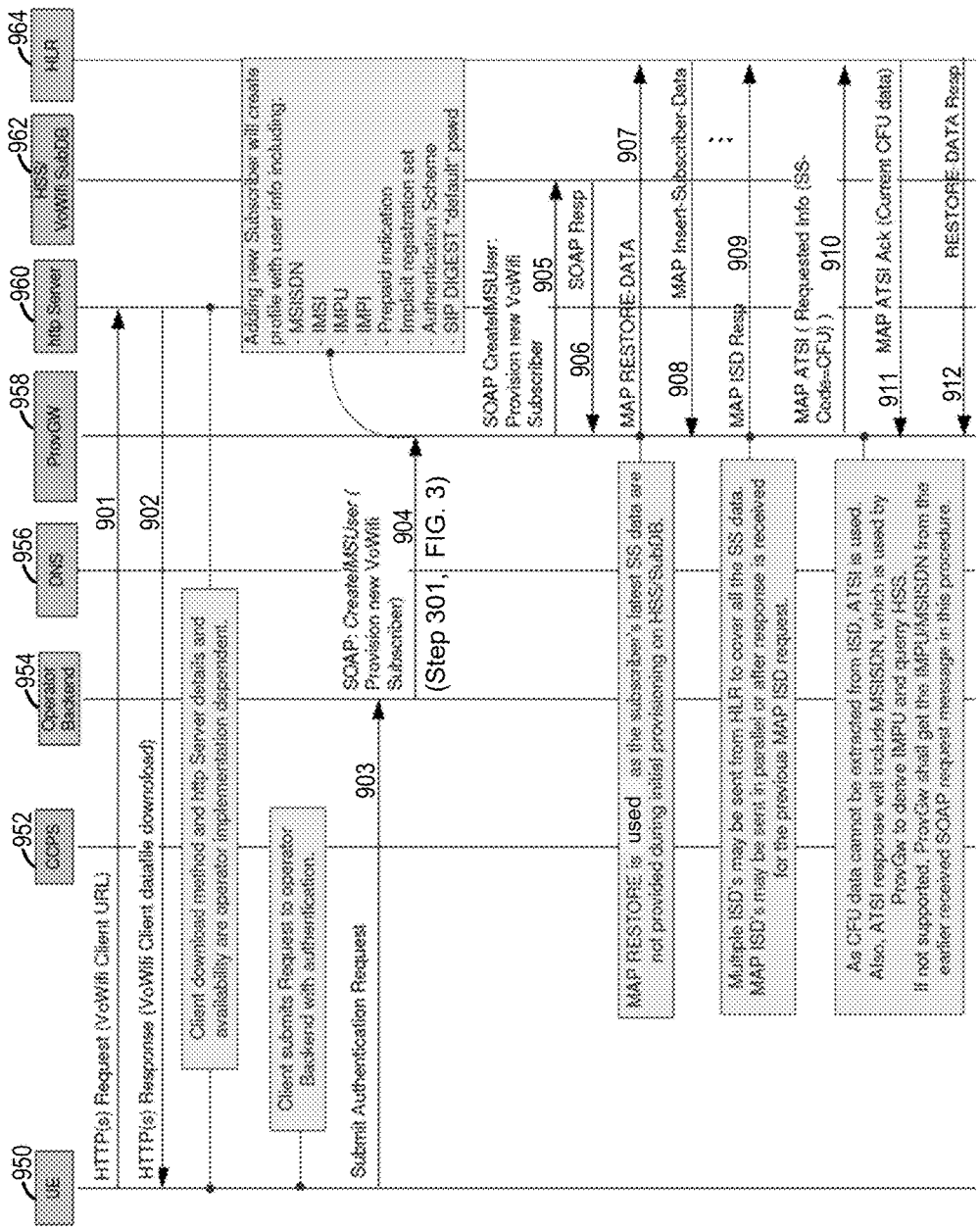
FIGS. 9A-9D illustrate a sequence diagram for a client setup and on-demand provisioning of supplementary services settings synchronization on a packet-switched network in accordance with exemplary embodiments of the disclosure.
Figure 9B:
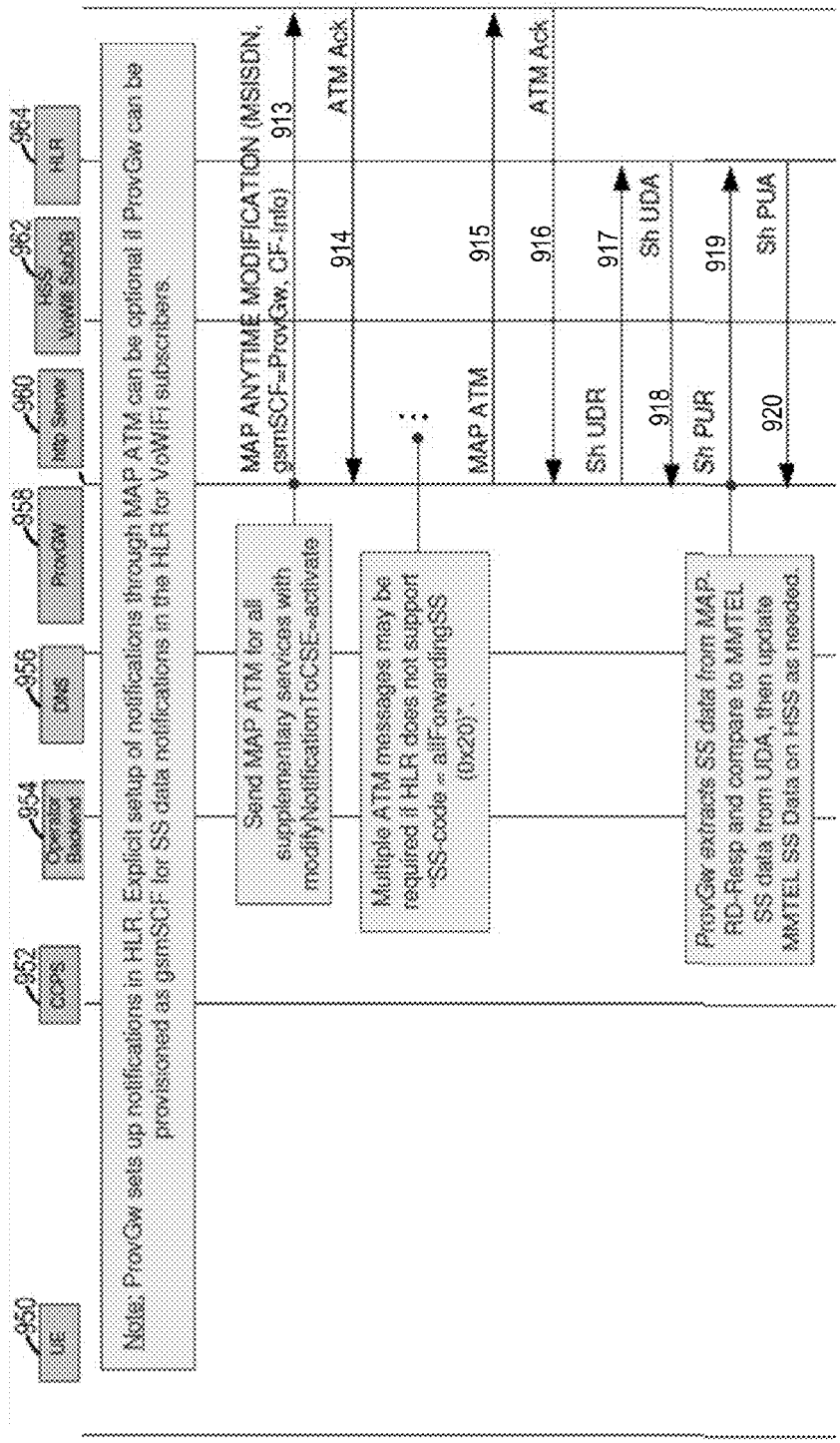
Figure 9C:
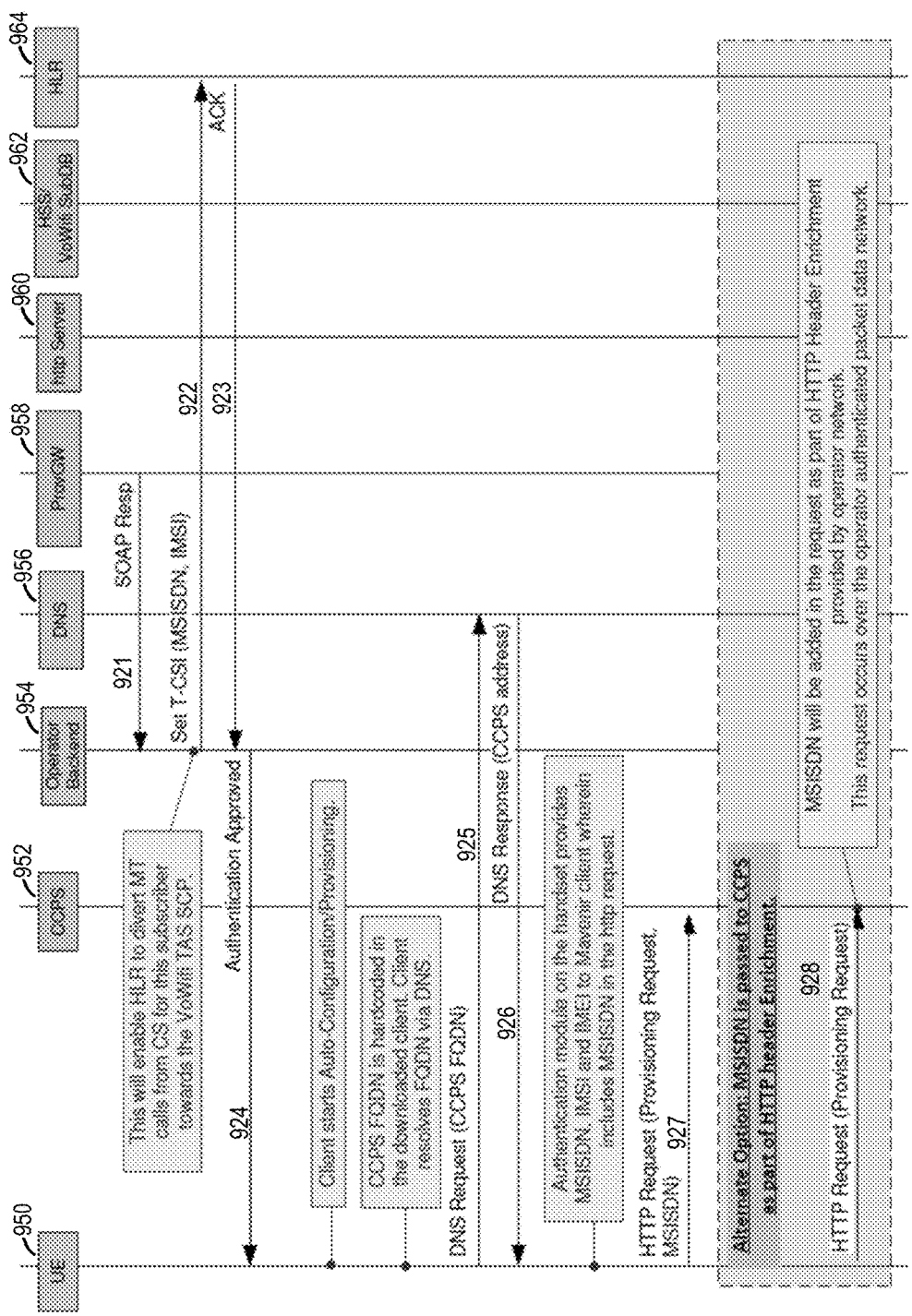
Figure 9D:
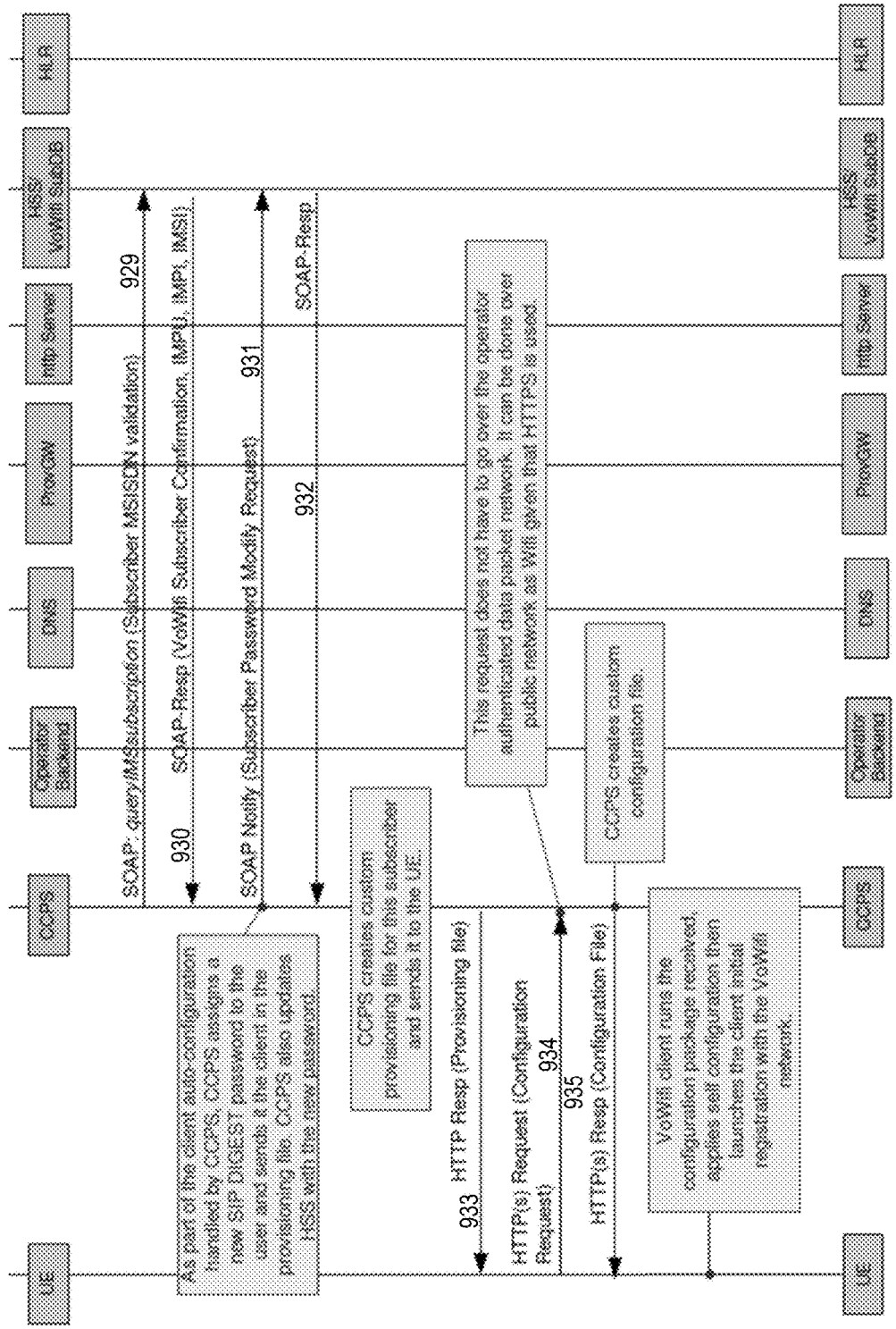

FIG. 8 illustrates a method of an operator providing updates to SS data in a PS network. In this case, provisioning database sends updates SS data to communication system synchronization node 148 (step 801). If communication system synchronization node 148 does not know what changes have been applied, communication system synchronization node 148 gets the old data from HSS (step 802), and identifies the SS data changes between the old and the new data. Next, communication system synchronization node 148 send a message to HLR 114 to update HLR 114 with the new DD data (step 803) and an acknowledgment is sent (step 804). HSS 128 is then updated (step 805), and a success response can be sent to operator's provisioning database 146 (step 806). HSS 128 can also push a notification to TAS 132 with the new SS data changes (step 807).

Figure 15A:
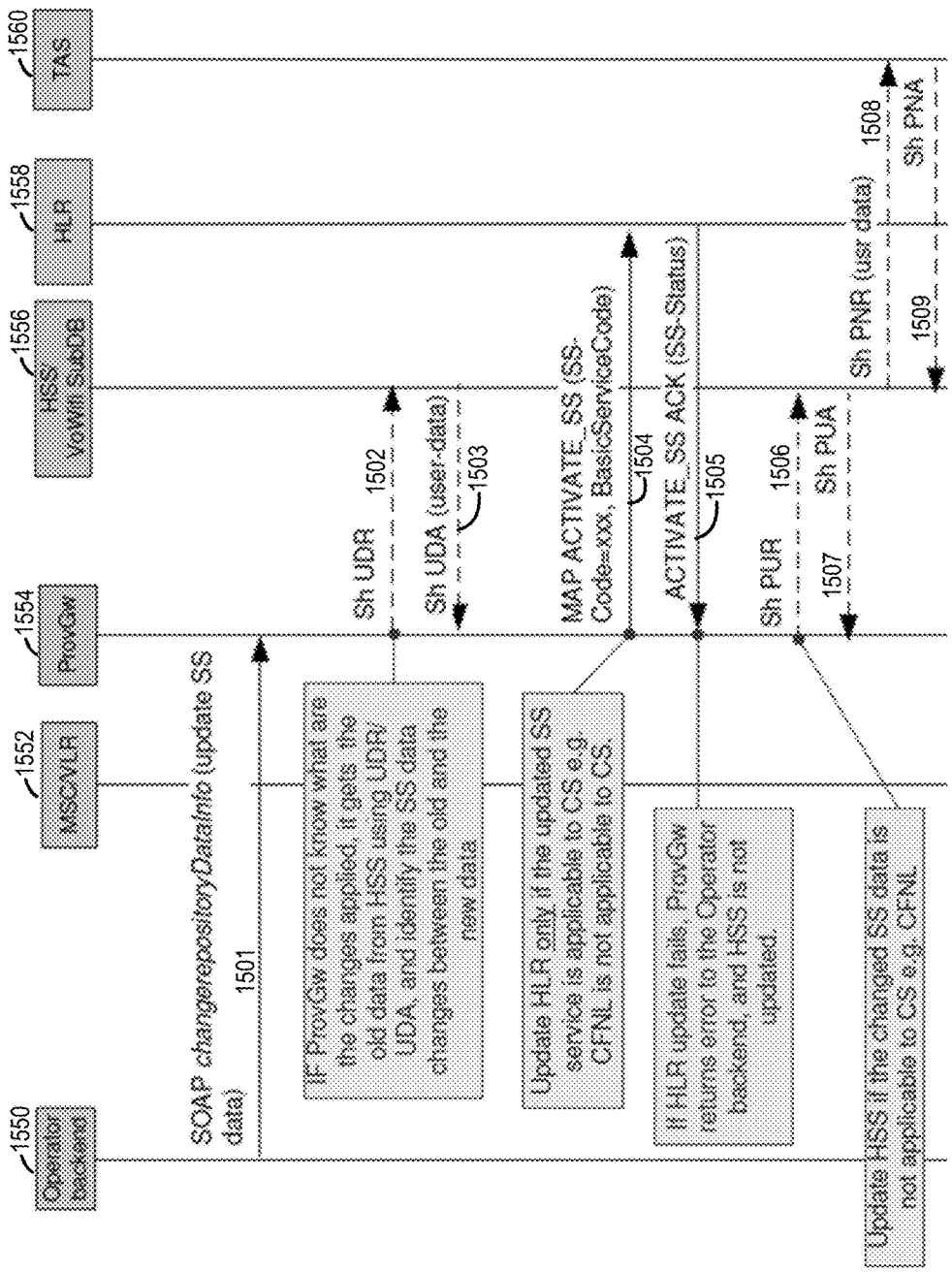
FIGS. 15A-15B illustrate a sequence diagram for modifying supplementary services settings by an operator of a packet-switched network in accordance with exemplary embodiments of the disclosure.
Figure 15B:
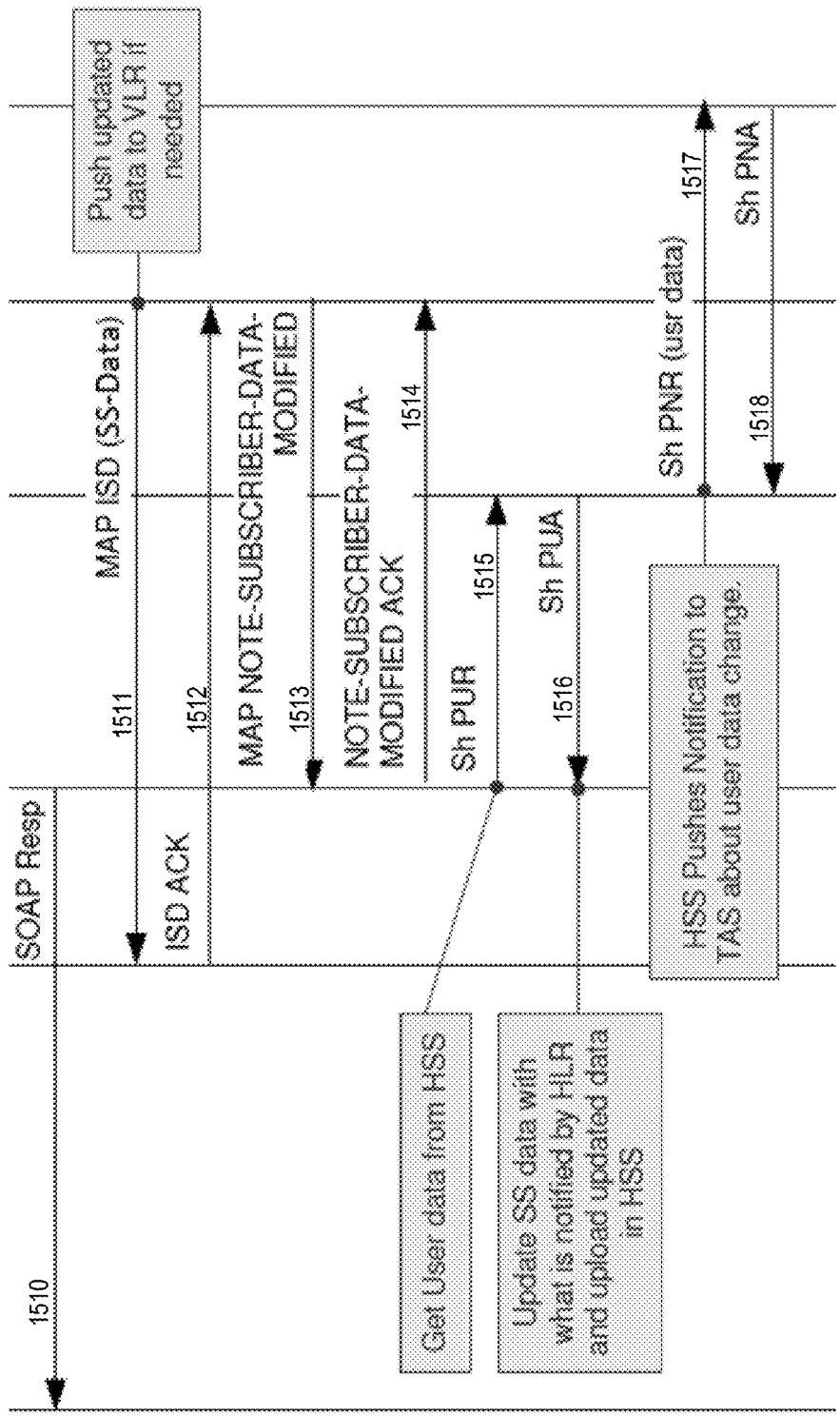

FIGS. 15A-15B illustrate an exemplary message flow for implementing the method illustrated in FIG. 8. In the illustrated example, the message flow begins with an operator backend 1550 sending updated SS data to ProvGw 1554. If ProvGw 1554 does not know the changes applied, ProvGw 1554 gets the old data from HSS 1556 using UDR/UDA, and identifies the changes in the SS data (steps 1502-1503). Next, HLR 1558 is updated only if the updated SS data is applicable to the CS network (steps 1504-1505). If the HLR update fails, ProvGw 1554 returns an error to operator backend 1550, and HSS 1556 is not updated (step 1505), and HSS 1556 is updated if the changed SS data is not applicable to the CS network (steps 1507-1510). Next, updates SS data is pushed to MSC/VLR, if needed and an acknowledgement is sent (steps 1511-1514). Next, SS data is retrieved from HSS 1556 (step 1515). Then, SS data with what is notified by HLR is uploaded and updated on HSS (step 1516). HSS 1556 then pushes notifications to TAS 1560 about the SS data change (steps 1517-1518).

In this disclosure, the terms "module," "node," and "entity" may be used to refer to a physical circuit, a collection of hardware components, a logical module, firmware, software (applications, functions, subroutines, etc.), functional module, and/or a combination of the above.

Figure 16:
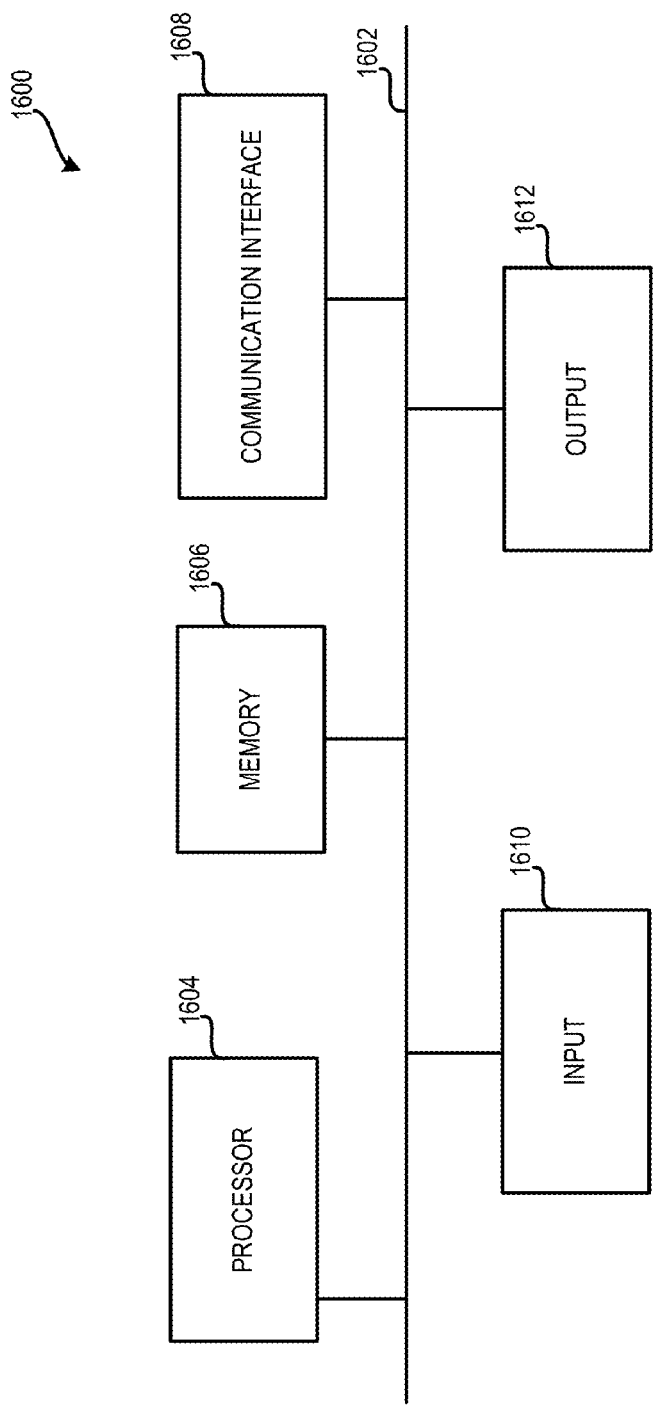
FIG. 16 illustrates a block diagram of an exemplary synchronization node in accordance with various embodiments of the disclosure.

Referring to FIG. 16, an exemplary network node or entity 1600, such as communication system synchronization node 148 or a TAS 132, alone, or on which on which the communication system synchronization node 148 resides, can include a bus 1602 interconnecting a processor 1604, a memory 1606, a communication interface 1608, an input device 1610, and an output device 1612. Bus 1602 enables communication among the components of network node 1600. Processor 1604 may include one or more processing units or microprocessors that interpret and execute coded instructions. In other implementations, processor 1604 may be implemented by or include one or more application-specific integrated circuits (ASICs), field programmable gate arrays (FPGAs), or the like.

Memory 1606 may include a random access memory (RAM) or another type of dynamic storage device that stores information and instructions for execution by the processor 94. Memory 1606 may also include a read-only memory (ROM) or another type of static storage device that stores static information and instructions for processor 1604. Memory 1606 may further include other types of magnetic or optical recording medium and its corresponding drive for storing information and/or instructions.

Communication interface 1608 may include any transceiver-like device and antenna that enables the network node 1600 to communicate via radio frequency with other devices and/or systems. Communication interface 1608 may further include interfaces, ports, or connectors to other devices.

Input 1610 may include one or more devices that permit an operator to enter information to the network node 1600, such as a keyboard, a keypad, a mouse, a pen, a touch-sensitive pad or screen, a microphone, one or more biometric mechanisms, and the like. Output 1612 may include one or more devices that outputs information to the operator, such as a display, a printer port, a speaker, etc.

As described herein, network node 1600 may perform certain operations in response to the processor 1604 executing software instructions contained in a computer-readable medium, such as memory 1606. A computer-readable medium may be defined as a physical or logical memory device. A logical memory device may include memory space within a single physical memory device or spread across multiple physical memory devices. The software instructions may be read into memory 1606 from another computer-readable medium or from another device via a communication interface 1608. The software instructions contained in the memory 1606 may cause processor 1604 to perform processes described herein. Alternatively, hardwired circuitry may be used in place of or in combination with software instructions to implement processes described herein. Thus, implementations described herein are not limited to any specific combination of hardware circuitry and software.

SPECIFIC EXAMPLES

The following non-limiting examples illustrate various systems, methods, and nodes in accordance with various embodiments of the disclosure. These examples are merely illustrative, and it is not intended that the invention be limited to these examples.

1. A communication system synchronization node for synchronizing supplementary services settings between a circuit-switched network and a packet-switched network, the communication system synchronization node comprising:
a first interface configured to transmit and receive messages to and from a home location register (HLR) in the circuit-switched network;
a second interface configured to send and receive messages to and from a home subscriber server (HSS) in the packet-switched network;
a third interface configured to communicate with an operator provisioning database; and
a synchronization function module configured to:
receive a message, indicating a change to a supplementary service settings associated with a user, from the HLR, via the first interface; and
send a message, indicating the change to a supplementary service settings associated with the user to the HSS, via the second interface.

2. The communication system synchronization node of example 1, wherein the synchronization function module is further configured to receive a message, indicating a change to a supplementary service settings associated with a user, from the operator provisioning database, via the third interface.

3. The communication system synchronization node of any of examples 1-2, wherein the first interface uses mobile application part (MAP) protocol.

4. The communication system synchronization node of any of examples 1-3, wherein the second interface is a Sh interface.

5. The communication system synchronization node of any of examples 1-4, wherein the second interface uses DIAMETER protocol.

6. The communication system synchronization node of any of examples 1-5, wherein the third interface uses simple object access protocol (SOAP).

7. The communication system synchronization node of any of example -6, further comprising a fourth interface to the HSS.

8. The communication system synchronization node of example 7, wherein the fourth interface uses simple object access protocol (SOAP).

9. The communication system synchronization node of example 7, wherein the fourth interface is a Sh interface.

10. The communication system synchronization node of example 1, wherein the communication system synchronization node is configured to update a HLR first and then update the HSS with revised supplementary services settings.

11. A system including the communication system synchronization node of any of examples 1-10.

12. (Example illustrated in FIG. 3) A method for synchronizing supplementary services settings in a circuit-switched network and a packet-switched network, the method comprising the steps of:
provisioning user profile information including supplementary services settings on a communication system synchronization node;
provisioning the user profile information from the communication system synchronization node to a home subscriber server (HSS) in the packet-switched network;
retrieving current supplementary services settings for a user from a home location register (HLR) in the circuit-switched network;
setting up a notification of supplementary services settings change for a user on the HLR;
retrieving user data from the HSS; and
adding the supplementary services settings information retrieved from the HLR to the data retrieved from the HSS and uploading a merged combination of the data retrieved from the HSS and the information retrieved from the HLR to the HSS.

13. The method for synchronizing supplementary services settings of example 12, wherein the step of retrieving current supplementary services settings for a user from a home location register (HLR) in the circuit-switched network comprises use of MAP protocol.

14. The method for synchronizing supplementary services settings of example 12, wherein the step of provisioning user profile information including supplementary services settings on a communication system synchronization node comprises SOAP.

15. (Example illustrated in FIG. 6) A method of synchronizing supplementary services settings in a circuit-switched network and a packet-switched network, the method comprising the steps of:
updating supplementary services settings in a telephony application server (TAS) in the packet-switched network;
sending a message from the TAS to a home location register (HLR) in the circuit-switched network to update the supplementary services settings on the HLR;
sending a notification of supplementary services settings to a communication system synchronization node; and
sending a message from the communication system synchronization node to a home subscriber server (HSS) to update the supplementary services settings on the HSS.

16. (Example illustrated in FIG. 7) A method of an operator providing updates to synchronizing supplementary services settings in a circuit-switched network, the method comprising the steps of:
sending a message from an operator database to a home location register (HLR) in the circuit-switched network to update the supplementary services settings on the HLR;
sending a message including the updated supplementary services settings from the HLR to an MSC/VLR node;
updating the supplementary services settings on the MSC/VLR node;
sending a message including the updated supplementary services settings from the HLR to a communication system synchronization node; and
sending a message including the updated supplementary services settings from the communication system synchronization node to a home subscriber server (HSS) to update the supplementary services settings on the HSS.

17. The method of an operator providing updates to synchronizing supplementary services settings in a circuit-switched network of example 13, the method further comprising a step of pushing a notification from the HSS to a telephony application server (TAS).

18. (Example illustrated in FIG. 8) A method of an operator providing updates to synchronizing supplementary services settings in a circuit-switched network and a packet-switched network, the method comprising the steps of:
sending a message comprising updated supplementary services settings from an operator database to a communication system synchronization node;
if the communication system synchronization node does not know what changes have been applied to the supplementary services settings, the communication system synchronization node retrieving the old supplementary services settings from a home subscriber server (HSS) and identifying the supplementary services settings changes between the old and the new supplementary services settings;

sending a message including the updated supplementary services settings from the communication system synchronization node to a home location register (HLR); and sending a message from the communication system synchronization node to the HSS to update the HSS with the new supplementary services settings.

19. (Example illustrated in FIG. 4) A method of synchronizing supplementary services settings in a circuit-switched network and a packet-switched network when a user equipment (EU) is registered in the circuit-switched network, the method comprising the steps of:

sending a message comprising updated supplementary services settings from the UE to a call-switching node of a circuit-switched network;

sending a message containing the updated supplementary services settings from the call-switching node of a circuit-switched network to a home location register (HLR) in the circuit-switched network;

notifying a communication system synchronization node of the updated supplementary services settings by sending a message from the HLR to the communication system synchronization node;

sending a message comprising the updated supplementary services settings from the communication system synchronization node to a home subscriber server (HSS) in the packet-switched network; and sending a message from the HSS to a telephony application server (TAS) to notify the TAS of the updated supplementary services settings.

20. (Example illustrated in FIG. 5) A method of synchronizing supplementary services settings in a circuit-switched network and a packet-switched network when a user equipment (EU) is registered in the packet-switched network, the method comprising the steps of:

updating supplementary services settings in a telephony application server (TAS) in the packet-switched network;

sending a message comprising the updated supplementary services settings from the TAS to a home location register (HLR) in the circuit-switched network to update the supplementary services settings on the HLR; and sending a message comprising the updated supplementary services settings from the TAS to a home subscriber server (HSS) to update the supplementary services settings on the HSS.

21. The method of example 20, further comprising a step of sending an acknowledgement message from the TAS to the UE.

22. The method of example 20, further comprising a step of sending from the UE to the TAS, the message comprising updated supplementary services settings.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand alone or combined in any combination. It will be recognized that changes and modifications may be made to the exemplary embodiments without departing from the scope of the present invention. These and other changes or modifications are intended to be included within the scope of the present invention, as expressed in the following claims.

We claim:

1. A communication system synchronization node for synchronizing supplementary services settings between a circuit-switched network and a packet-switched network, the communication system synchronization node comprising:
    a first interface configured to transmit and receive messages to and from a home location register (HLR) in the circuit-switched network;
    a second interface configured to send and receive messages to and from a home subscriber server (HSS) in the packet-switched network;
    a third interface configured to communicate with an operator provisioning database; and
    a synchronization function module configured to:
        provision user profile information of a user including supplementary services settings from the operator provisioning database;
        provision the user profile information to the HSS;
        retrieve current supplementary services settings for the user from the HLR;
        set up a notification of supplementary services settings change for the user on the HLR;
        retrieve user data from the HSS; and
        add the supplementary services settings information retrieved from the HLR to the user data retrieved from the HSS and upload a merged combination of the user data retrieved from the HSS and the supplementary services settings information retrieved from the HLR to the HSS.

2. The communication system synchronization node of claim 1, wherein the synchronization function module is configured to:
    receive a message, indicating a change to a supplementary service settings associated with a user, from the HLR, via the first interface;
    send a message, indicating the change to a supplementary service settings associated with the user to the HSS, via the second interface; and
    receive a message, indicating a change to a supplementary service settings associated with a user, from the operator provisioning database, via the third interface.

3. The communication system synchronization node of claim 2, wherein the communication system synchronization node is configured to update the HLR first and then update the HSS with revised supplementary services settings.

4. The communication system synchronization node of claim 1, wherein at least one of:
    the first interface uses mobile application part (MAP) protocol; and
    the second interface is a Sh interface.

5. The communication system synchronization node of claim 1, wherein the third interface uses simple object access protocol (SOAP).

6. The communication system synchronization node of claim 1, wherein the second interface uses DIAMETER protocol.

7. The communication system synchronization node of claim 1, further comprising a fourth interface to the HSS.

8. The communication system synchronization node of claim 7, wherein the fourth interface uses simple object access protocol (SOAP).

9. A method for synchronizing supplementary services settings in a circuit-switched network and a packet-switched network, the method comprising the steps of:

provisioning user profile information including supplementary services settings on a communication system synchronization node;

provisioning the user profile information from the communication system synchronization node to a home subscriber server (HSS) in the packet-switched network;

retrieving current supplementary services settings for a user from a home location register (HLR) in the circuit-switched network;

setting up a notification of supplementary services settings change for a user on the HLR;

retrieving user data from the HSS; and adding the supplementary services settings information retrieved from the HLR to the data retrieved from the HSS and uploading a merged combination of the data retrieved from the HSS and the information retrieved from the HLR to the HSS.

10. The method for synchronizing supplementary services settings of claim 9, wherein the step of retrieving current supplementary services settings for a user from a home location register (HLR) in the circuit-switched network comprises use of MAP protocol.

11. The method for synchronizing supplementary services settings of claim 9, wherein the step of provisioning user profile information including supplementary services settings on a communication system synchronization node comprises SOAP.

12. The method for synchronizing supplementary services settings of claim 9, wherein the step of retrieving current supplementary services settings for a user from a home location register (HLR) in the circuit-switched network comprises using a Sh interface.

13. The method for synchronizing supplementary services settings of claim 9, wherein the step of provisioning the user profile information from the communication system synchronization node to a home subscriber server (HSS) comprises using a Sh interface.

14. The method for synchronizing supplementary services settings of claim 9, the method further comprising the steps of:

updating supplementary services settings in a telephony application server (TAS) in the packet-switched network;

sending a message from the TAS to a home location register (HLR) in the circuit-switched network to update the supplementary services settings on the HLR;

sending a notification of supplementary services settings to a communication system synchronization node; and sending a message from the communication system synchronization node to a home subscriber server (HSS) to update the supplementary services settings on the HSS.

15. The method for synchronizing supplementary services settings of claim 9, the method further comprising the steps of:

sending a message from an operator database to a home location register (HLR) in the circuit-switched network to update the supplementary services settings on the HLR;

sending a message including the updated supplementary services settings from the HLR to an MSC/VLR node;

updating the supplementary services settings on the MSC/VLR node;

sending a message including the updated supplementary services settings from the HLR to a communication system synchronization node; and sending a message including the updated supplementary services settings from the communication system synchronization node to a home subscriber server (HSS) to update the supplementary services settings on the HSS.

16. The method for synchronizing supplementary services settings of claim 15, the method further comprising the steps of pushing a notification from the HSS to a telephony application server (TAS).

17. The method for synchronizing supplementary services settings of claim 9, the method further comprising the steps of:

updating supplementary services settings in a telephony application server (TAS) in the packet-switched network;

sending a message comprising the updated supplementary services settings from the TAS to a home location register (HLR) in the circuit-switched network to update the supplementary services settings on the HLR; and sending a message comprising the updated supplementary services settings from the TAS to a home subscriber server (HSS) to update the supplementary services settings on the HSS.

18. The method of claim 17, further comprising a step of sending an acknowledgement message from the TAS to the UE.

19. The method of claim 17, further comprising a step of sending from the UE to the TAS, the message comprising updated supplementary services settings.

20. The method of claim 17, wherein the step of sending a message comprising the updated supplementary services settings from the TAS to a home location register (HLR) comprises mobile application part (MAP) protocol.

* * * * *